US 6,588,842 B2

(12) United States Patent
Stumpf et al.

(10) Patent No.: US 6,588,842 B2
(45) Date of Patent: Jul. 8, 2003

(54) BACKREST

(75) Inventors: William E. Stumpf, Minneapolis, MN (US); Rodney C. Schoenfelder, Minneapolis, MN (US); Donald Chadwick, Los Angeles, CA (US); Carolyn Keller, Holland, MI (US); Timothy P. Coffield, Grand Rapids, MI (US); Randy J. Sayers, Belding, MI (US); Jeffrey W. Bruner, Greensboro, NC (US); Eric Cammenga, Holland, MI (US)

(73) Assignee: Herman Miller, Inc., Zeeland, MI (US)

( * ) Notice: Subject to any disclaimer, the term of this patent is extended or adjusted under 35 U.S.C. 154(b) by 0 days.

(21) Appl. No.: 09/859,694

(22) Filed: May 17, 2001

(65) Prior Publication Data

US 2001/0030453 A1 Oct. 18, 2001

Related U.S. Application Data

(63) Continuation of application No. 08/347,475, filed as application No. PCT/US93/05731 on Jun. 15, 1993, now Pat. No. 6,386,634, which is a continuation-in-part of application No. 07/898,907, filed on Jun. 15, 1992, now abandoned.

(51) Int. Cl.[7] ................................................. A47C 7/02
(52) U.S. Cl. ................................ 297/284.4; 297/452.64
(58) Field of Search ........................... 297/284.4, 284.1, 297/452.64, 452.63, 452.56, 452.18, 452.13, 230.11, 230.14, 230.13, 230.1, 284.6, 284.8, 284.7, 284.5

(56) References Cited

U.S. PATENT DOCUMENTS

| 226,082 A | 3/1880 | Lemman |
|---|---|---|
| 323,060 A | 7/1885 | Moore |
| 614,235 A | 11/1898 | Palmer |
| 662,647 A | 11/1900 | Howe |

(List continued on next page.)

FOREIGN PATENT DOCUMENTS

| CA | 653100 | 11/1962 |
|---|---|---|
| CA | 1 235 055 | 4/1988 |

(List continued on next page.)

OTHER PUBLICATIONS 7 page pamphlet from Konig & Neurath Germany (believed to be 1996).

"Taiwan Furniture", by Taiwan's Professional Furniture Industry Magazine, Jul. 1992.

(List continued on next page.)

Primary Examiner—Milton Nelson, Jr.
(74) Attorney, Agent, or Firm—Brinks Hofer Gilson & Lione

(57) ABSTRACT

A backrest for a chair comprising a frame, a membrane and a back support member. The membrane, at least a portion of which is transparent, is attached to the frame and has a first body-contacting surface and an opposite second surface. The back support member is attached to the frame and has a support surface. At least a portion of the support surface contacts the second surface of the membrane, and at least a portion of the back support member is visible through the membrane from the first body-contacting surface thereof. In another aspect, a backrest for a chair comprises a frame having a pair of side members, wherein each of the side members has a lower section and an upper section. The upper section extends rearwardly and outwardly from the lower section so as to form a bowed section therewith. A flexible membrane is attached to and extends between the side members, and has a bowed section corresponding to the bowed section of the side members. The membrane has a first body-contacting surface and an opposite second surface.

39 Claims, 29 Drawing Sheets

U.S. PATENT DOCUMENTS

| | | | |
|---|---|---|---|
| 1,120,686 A | | 12/1914 | Burrowes |
| 1,228,771 A | * | 6/1917 | Hanger |
| 2,260,352 A | * | 10/1941 | Trapani |
| 2,590,995 A | | 4/1952 | Merrill |
| 2,771,122 A | * | 11/1956 | Straub |
| 2,815,798 A | * | 12/1957 | Lohans |
| 2,845,997 A | | 8/1958 | Waite |
| 2,858,572 A | | 11/1958 | Burdick |
| 2,859,799 A | | 11/1958 | Moore |
| 2,859,801 A | | 11/1958 | Moore |
| 2,962,764 A | | 12/1960 | Trojanowski et al. |
| 3,009,578 A | | 11/1961 | Foote et al. |
| 3,014,226 A | * | 12/1961 | Wilfert |
| 3,015,148 A | | 1/1962 | Haddad |
| 3,041,109 A | | 6/1962 | Eames et al. |
| 3,107,991 A | | 10/1963 | Taussig |
| 3,112,987 A | | 12/1963 | Griffiths et al. |
| 3,115,678 A | | 12/1963 | Keen et al. |
| 3,124,092 A | | 3/1964 | Raynes |
| 3,165,359 A | | 1/1965 | Ashkouti |
| 3,208,085 A | | 9/1965 | Grimshaw |
| 3,214,314 A | | 10/1965 | Rowbottam |
| 3,273,877 A | | 9/1966 | Geller |
| 3,298,743 A | | 1/1967 | Albinson |
| 3,301,931 A | | 1/1967 | Morin |
| 3,314,721 A | | 4/1967 | Smith |
| 3,337,267 A | | 8/1967 | Rogers, Jr. |
| 3,399,926 A | | 9/1968 | Hehn |
| 3,431,022 A | | 3/1969 | Poppe |
| 3,434,181 A | | 3/1969 | Benzies |
| 3,534,129 A | | 10/1970 | Bartel |
| 3,589,967 A | | 6/1971 | Shirakawa |
| 3,601,446 A | | 8/1971 | Persson |
| 3,624,814 A | | 11/1971 | Borichevsky |
| 3,640,576 A | | 2/1972 | Morrison et al. |
| 3,758,356 A | | 9/1973 | Hardy |
| 3,807,147 A | | 4/1974 | Schoonen et al. |
| 3,817,806 A | | 6/1974 | Anderson et al. |
| 3,843,477 A | * | 10/1974 | Rowland |
| 3,844,612 A | | 10/1974 | Borggren et al. |
| 3,864,265 A | | 2/1975 | Markley |
| 3,902,536 A | | 9/1975 | Schmidt |
| 3,915,775 A | | 10/1975 | Davis |
| 3,947,068 A | | 3/1976 | Buhk |
| 3,961,001 A | | 6/1976 | Bethe |
| 3,965,944 A | | 6/1976 | Goff, Jr. et al. |
| 3,999,802 A | | 12/1976 | Powers |
| 4,008,029 A | | 2/1977 | Shokite |
| 4,010,980 A | | 3/1977 | Dubinsky |
| 4,018,479 A | | 4/1977 | Ball |
| 4,046,611 A | | 9/1977 | Sanson |
| 4,062,590 A | * | 12/1977 | Polsky et al. |
| 4,087,224 A | | 5/1978 | Moser |
| 4,107,371 A | | 8/1978 | Dean |
| 4,113,627 A | | 9/1978 | Leason |
| 4,116,736 A | | 9/1978 | Sanson et al. |
| 4,125,490 A | | 11/1978 | Hettinga |
| 4,149,919 A | | 4/1979 | Lea et al. |
| 4,152,023 A | | 5/1979 | Buhk |
| 4,161,504 A | | 7/1979 | Baldini |
| 4,189,880 A | | 2/1980 | Ballin |
| 4,234,226 A | * | 11/1980 | Colby |
| 4,299,645 A | | 11/1981 | Newsom |
| 4,302,048 A | | 11/1981 | Yount |
| 4,339,488 A | | 7/1982 | Brokmann |
| 4,364,887 A | | 12/1982 | Becht et al. |
| 4,380,352 A | | 4/1983 | Diffrient |
| 4,429,917 A | | 2/1984 | Diffrient |
| 4,465,534 A | | 8/1984 | Zelkowitz |
| 4,469,738 A | | 9/1984 | Himelreich, Jr. |
| 4,469,739 A | | 9/1984 | Gretzinger et al. |
| 4,502,729 A | | 3/1985 | Locher |
| 4,518,202 A | * | 5/1985 | Bitsch |
| 4,522,444 A | | 6/1985 | Pollock |
| 4,529,247 A | | 7/1985 | Stumpf et al. |
| 4,545,614 A | | 10/1985 | Abu-Isa et al. |
| 4,548,441 A | | 10/1985 | Ogg |
| 4,565,406 A | * | 1/1986 | Suzuki |
| 4,568,455 A | | 2/1986 | Huber et al. |
| 4,592,126 A | * | 6/1986 | Bottemiller |
| 4,601,516 A | | 7/1986 | Klein |
| 4,629,525 A | | 12/1986 | Rasmussen |
| 4,634,178 A | * | 1/1987 | Carney |
| 4,670,072 A | | 6/1987 | Pastor et al. |
| 4,709,962 A | | 12/1987 | Steinmann |
| 4,718,724 A | * | 1/1988 | Quinton et al. |
| 4,743,323 A | | 5/1988 | Hettinga |
| 4,796,955 A | | 1/1989 | Williams |
| 4,803,118 A | | 2/1989 | Sogi et al. |
| 4,815,499 A | | 3/1989 | Johnson |
| 4,815,789 A | | 3/1989 | Marcus |
| 4,819,458 A | | 4/1989 | Kavesh et al. |
| 4,826,249 A | | 5/1989 | Bradbury |
| 4,829,644 A | | 5/1989 | Kondo et al. |
| 4,830,697 A | | 5/1989 | Aizawa |
| 4,831,697 A | | 5/1989 | Urai |
| 4,842,257 A | | 6/1989 | Abu-Isa et al. |
| 4,846,230 A | | 7/1989 | Mock et al. |
| 4,852,228 A | | 8/1989 | Zeilinger |
| 4,860,415 A | | 8/1989 | Witzke |
| 4,869,554 A | | 9/1989 | Abu-Isa et al. |
| 4,885,827 A | | 12/1989 | Williams |
| 4,889,385 A | | 12/1989 | Chadwick et al. |
| 4,927,698 A | | 5/1990 | Jaco et al. |
| 4,939,183 A | | 7/1990 | Abu-Isa et al. |
| 4,942,006 A | | 7/1990 | Loren |
| 4,946,224 A | | 8/1990 | Leib |
| 4,966,411 A | | 10/1990 | Katagiri et al. |
| 4,968,366 A | | 11/1990 | Hukki et al. |
| 4,979,778 A | | 12/1990 | Shields |
| 4,981,326 A | | 1/1991 | Heidmann |
| 4,986,948 A | | 1/1991 | Komiya et al. |
| 4,988,145 A | | 1/1991 | Engel |
| 5,000,515 A | | 3/1991 | Deview |
| 5,009,827 A | | 4/1991 | Abu-Isa et al. |
| 5,009,955 A | | 4/1991 | Abu-Isa |
| 5,013,089 A | * | 5/1991 | Abu-Isa et al. |
| 5,015,034 A | | 5/1991 | Kindig et al. |
| 5,070,915 A | | 12/1991 | Kalin |
| 5,071,189 A | | 12/1991 | Kratz |
| 5,096,652 A | | 3/1992 | Uchiyama et al. |
| 5,100,713 A | | 3/1992 | Homma et al. |
| 5,106,678 A | | 4/1992 | Abu-Isa |
| 5,116,556 A | | 5/1992 | Danton |
| 5,117,865 A | | 6/1992 | Lee |
| 5,135,694 A | | 8/1992 | Akahane et al. |
| 5,153,049 A | | 10/1992 | Groshens |
| 5,153,065 A | | 10/1992 | Abu-Isa |
| 5,167,264 A | | 12/1992 | Kalin |
| 5,176,860 A | | 1/1993 | Storch |
| 5,178,815 A | | 1/1993 | Yokote |
| 5,256,291 A | | 10/1993 | Cagle |
| 5,288,136 A | | 2/1994 | Webber et al. |
| 5,318,348 A | | 6/1994 | Hess |
| 5,354,120 A | | 10/1994 | Volkle |
| 5,366,274 A | | 11/1994 | Roericht et al. |
| 5,503,455 A | | 4/1996 | Yang |
| 5,533,789 A | | 7/1996 | McLarty, III et al. |
| 5,547,251 A | | 8/1996 | Axelson |
| 5,596,888 A | | 1/1997 | McLarty, III et al. |
| 5,651,847 A | | 7/1997 | Loeffler |

| | | | | | |
|---|---|---|---|---|---|
| 5,662,383 A | 9/1997 | Hand | SU | 1065262 | 1/1984 |
| 6,035,901 A | 3/2000 | Stumpf et al. | WO | WO 89/06101 | 7/1989 |
| 6,059,368 A | 5/2000 | Stumpf et al. | WO | WO 92/20262 | 11/1992 |

FOREIGN PATENT DOCUMENTS

| | | |
|---|---|---|
| CN | 80211449 | 11/1991 |
| DE | 35 37 203 | 3/1988 |
| DE | 38 37 727 | 5/1990 |
| DE | 40 41 157 | 7/1991 |
| EP | 0 032 839 | 7/1981 |
| FR | 820.791 | 11/1937 |
| JP | 57-89944 | 6/1982 |

OTHER PUBLICATIONS

"Leno Weaving–In General–" Grob+Co, Ltd., 1993.

Copy of application as filed, Ser. No. 08/347,475, filed Nov. 17, 1995.

Copy of application as filed, Ser. No. 09/859,696, filed May 17, 2001.

* cited by examiner

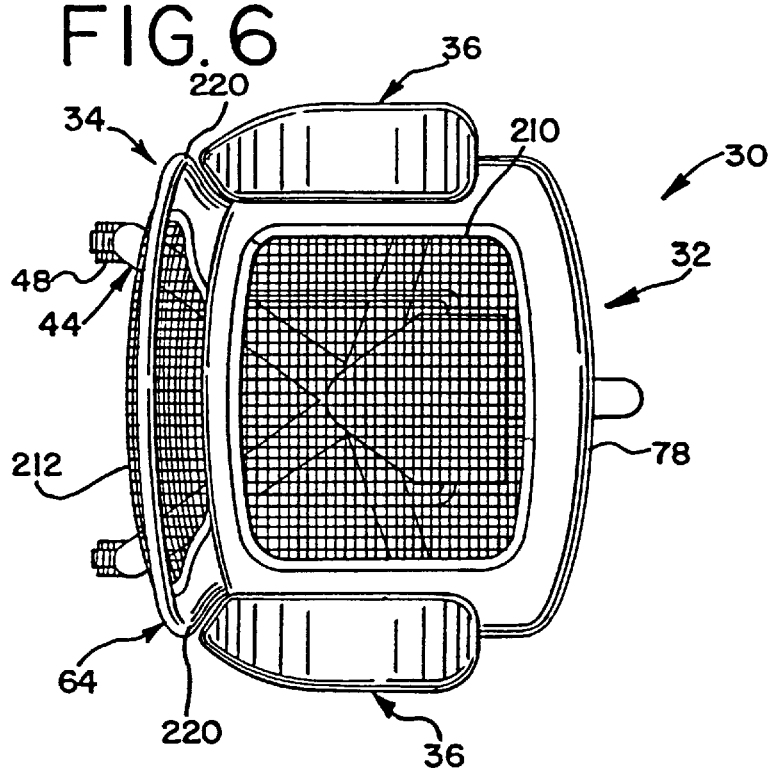
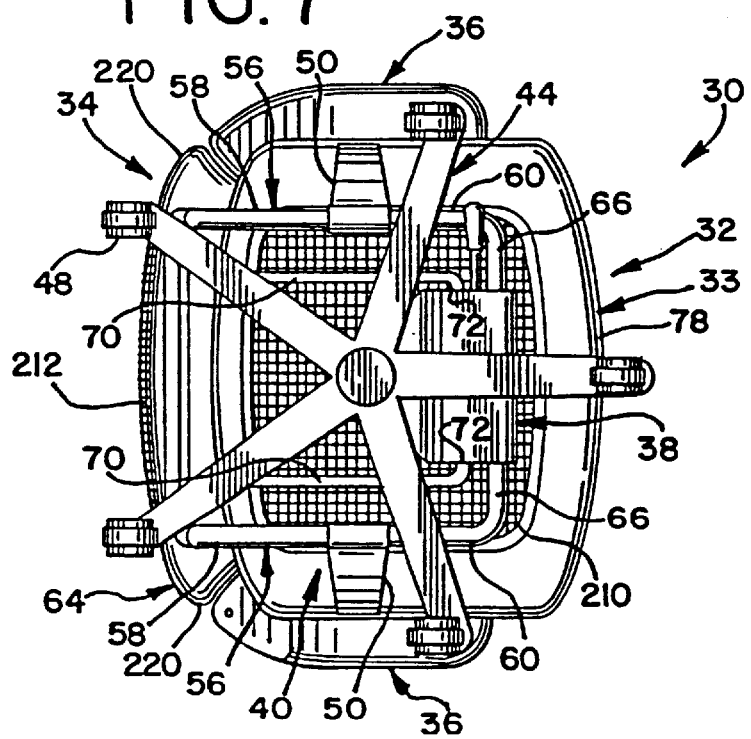

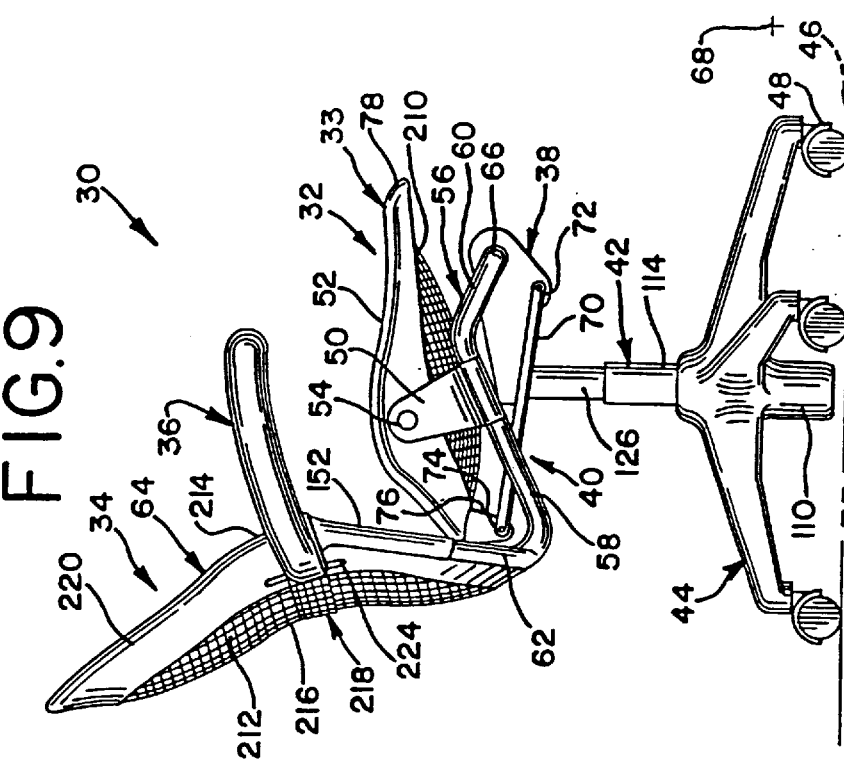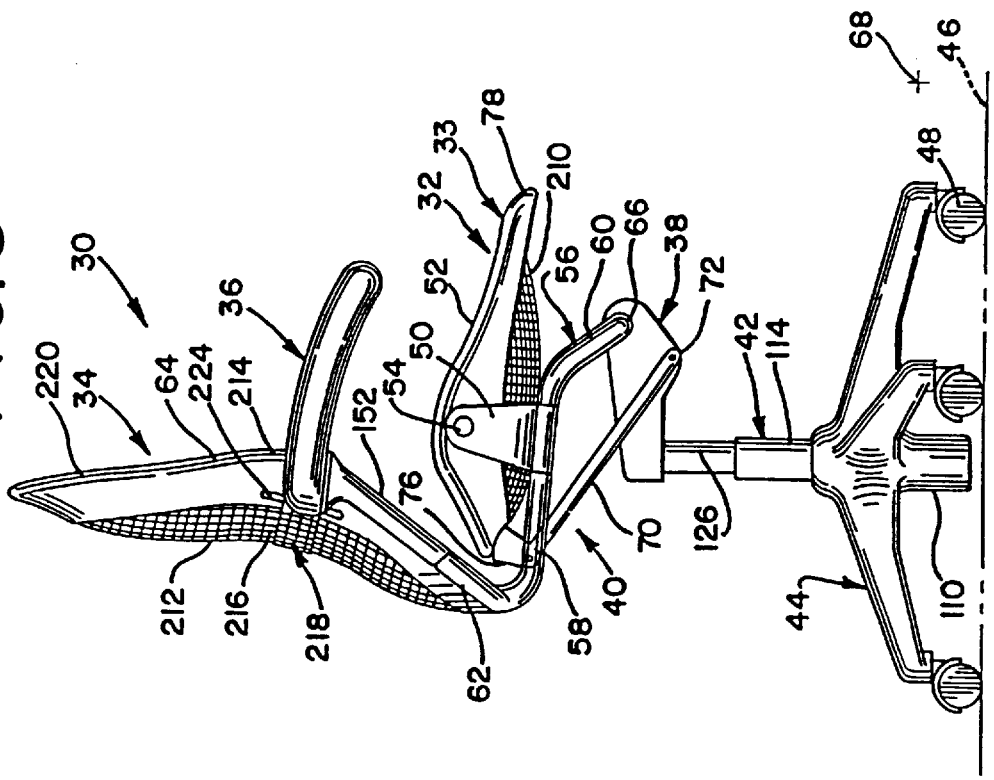

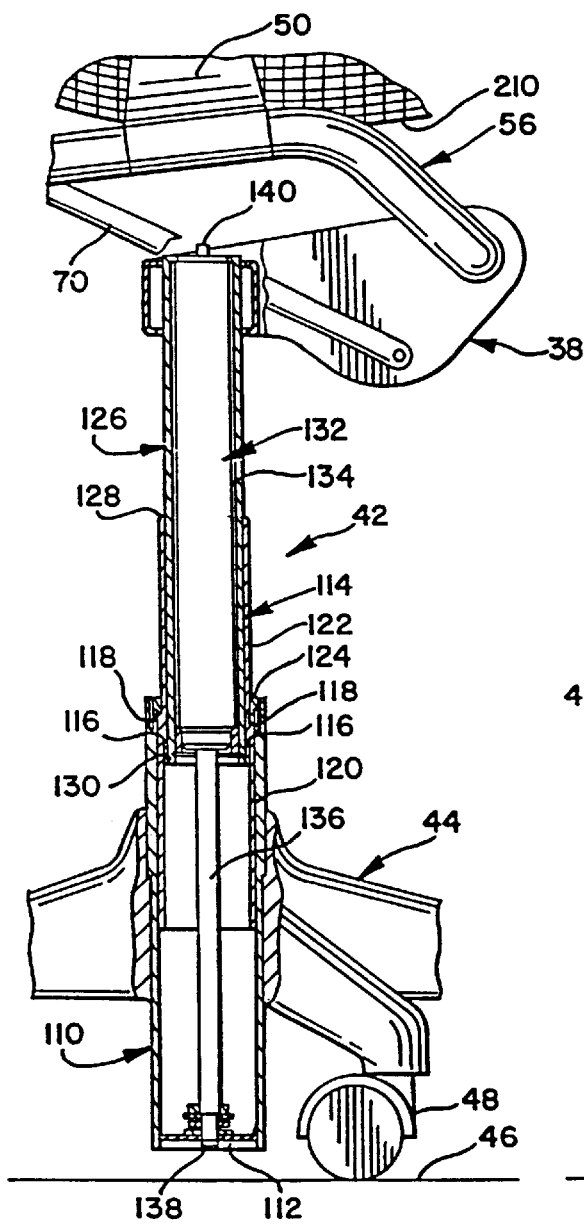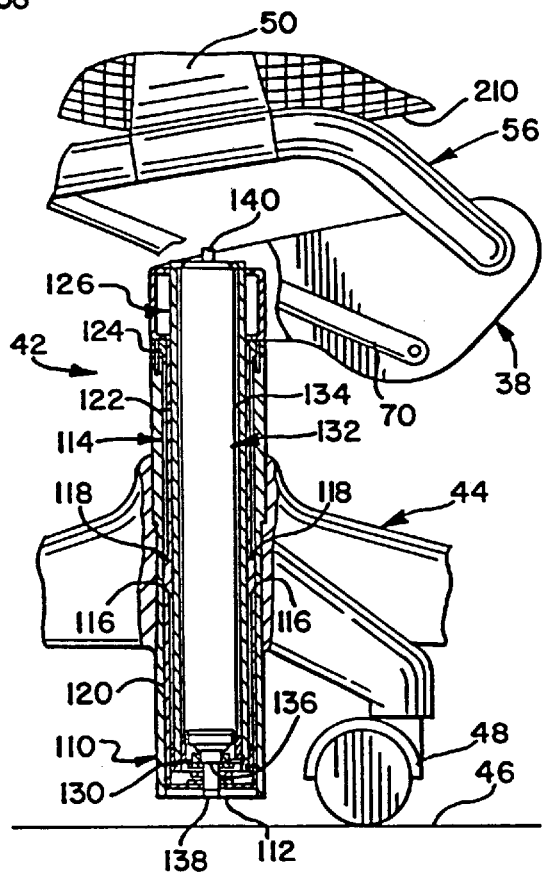

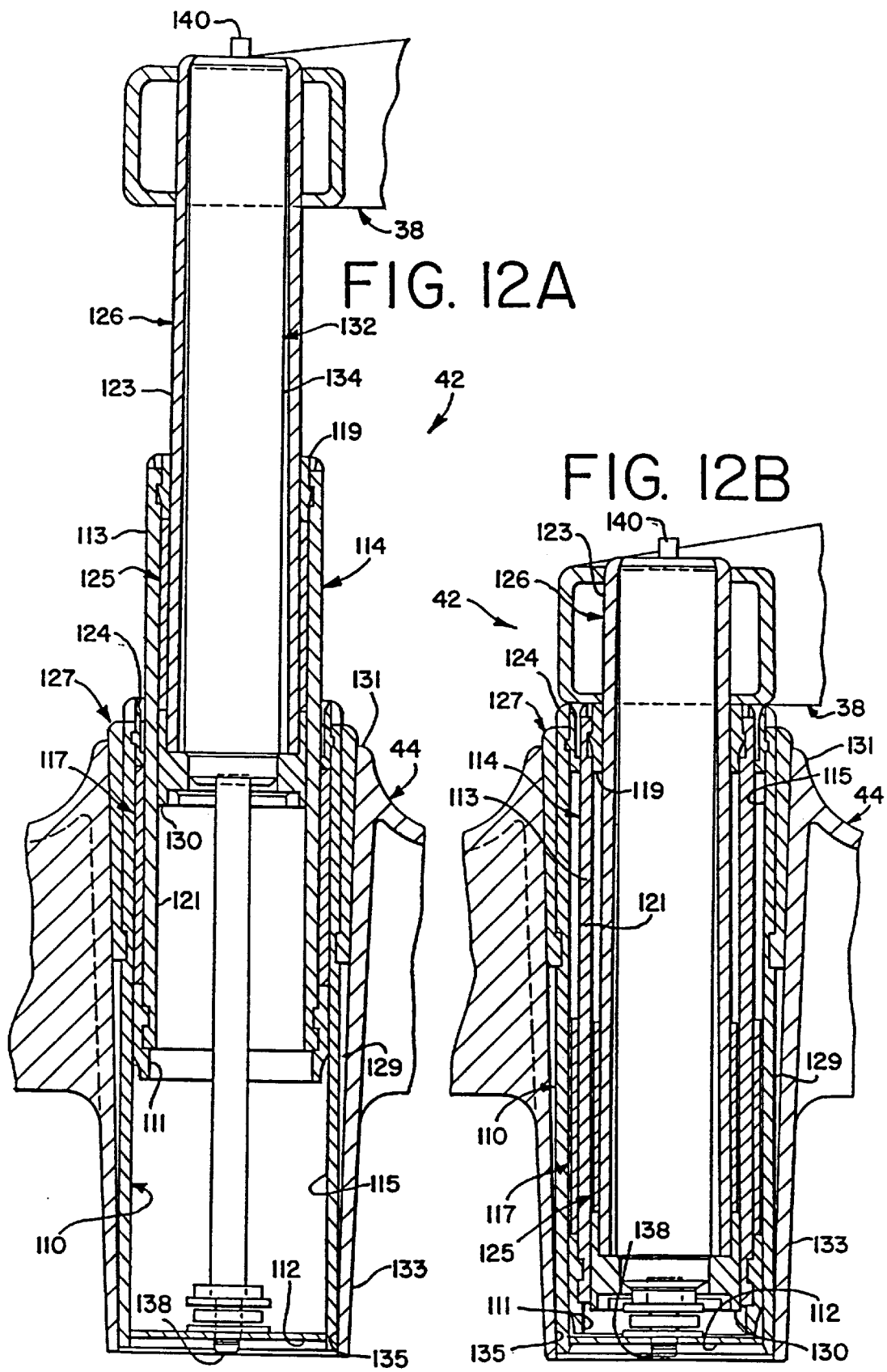

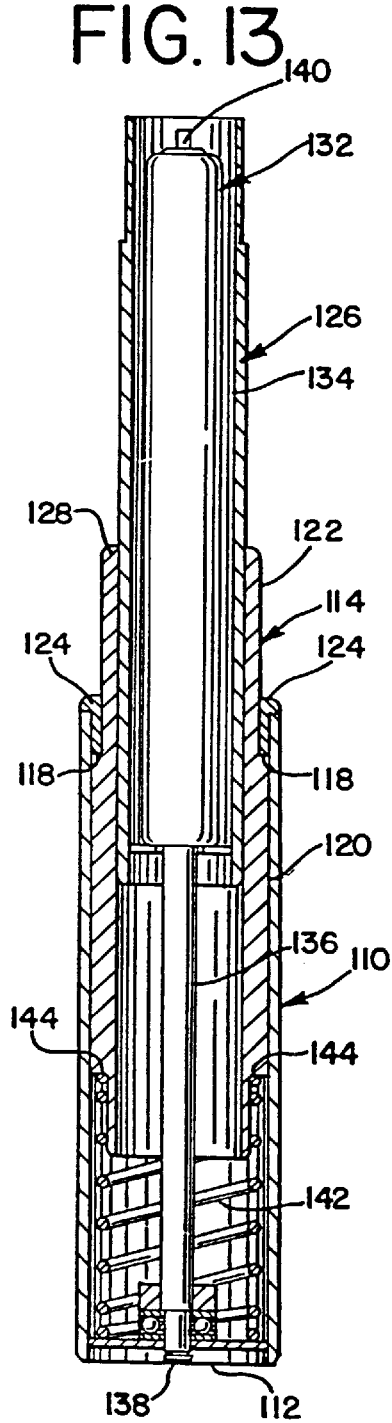
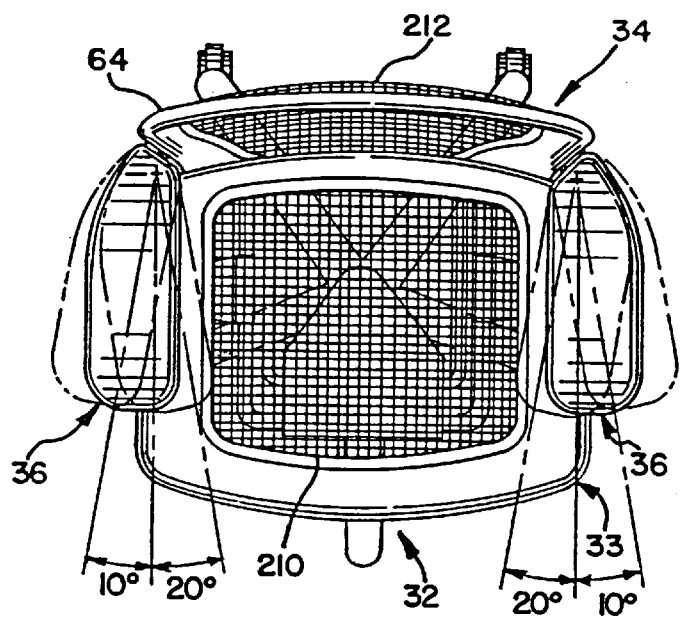

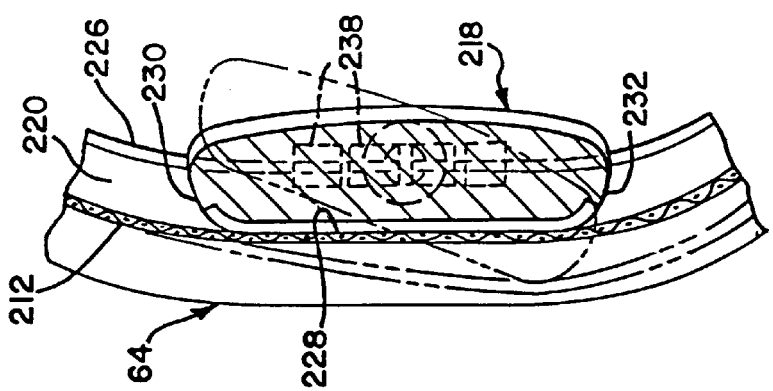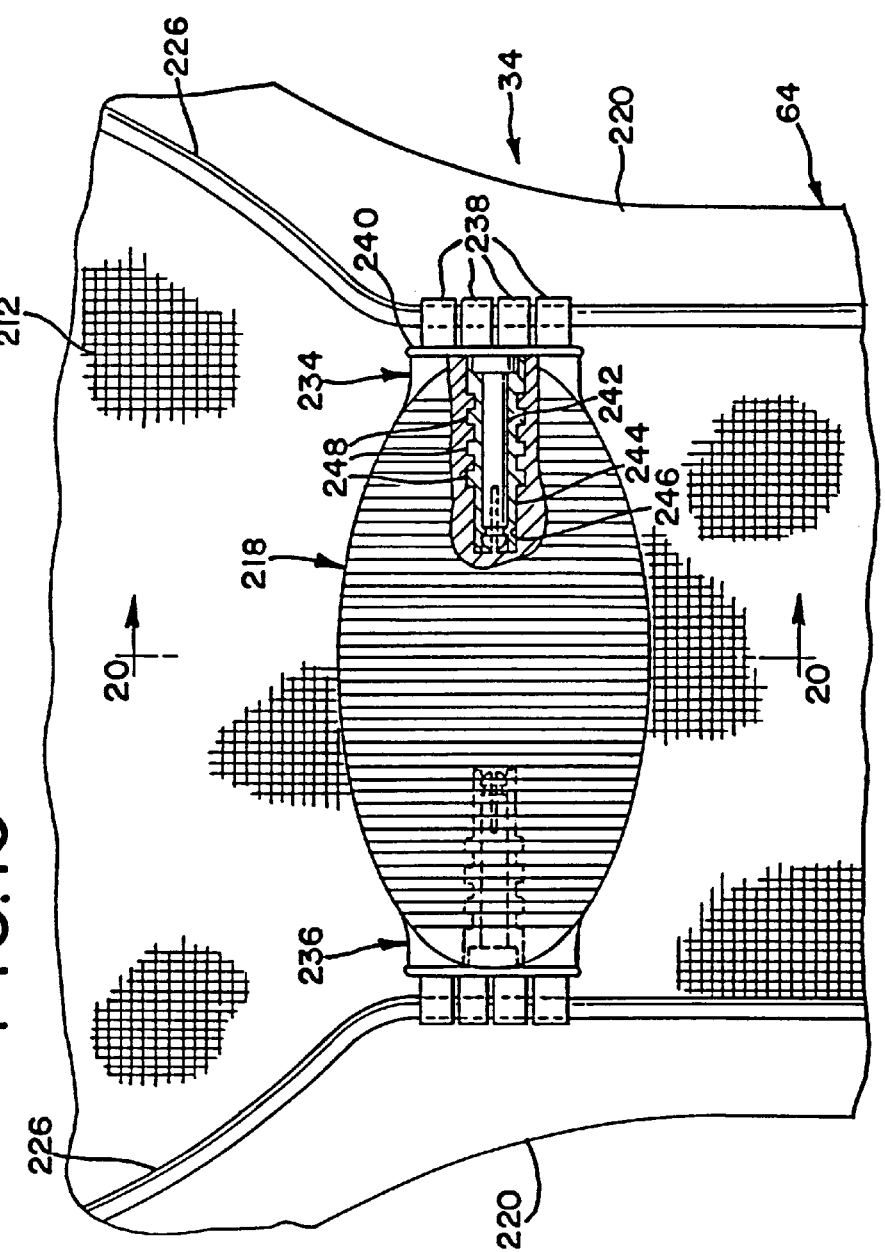

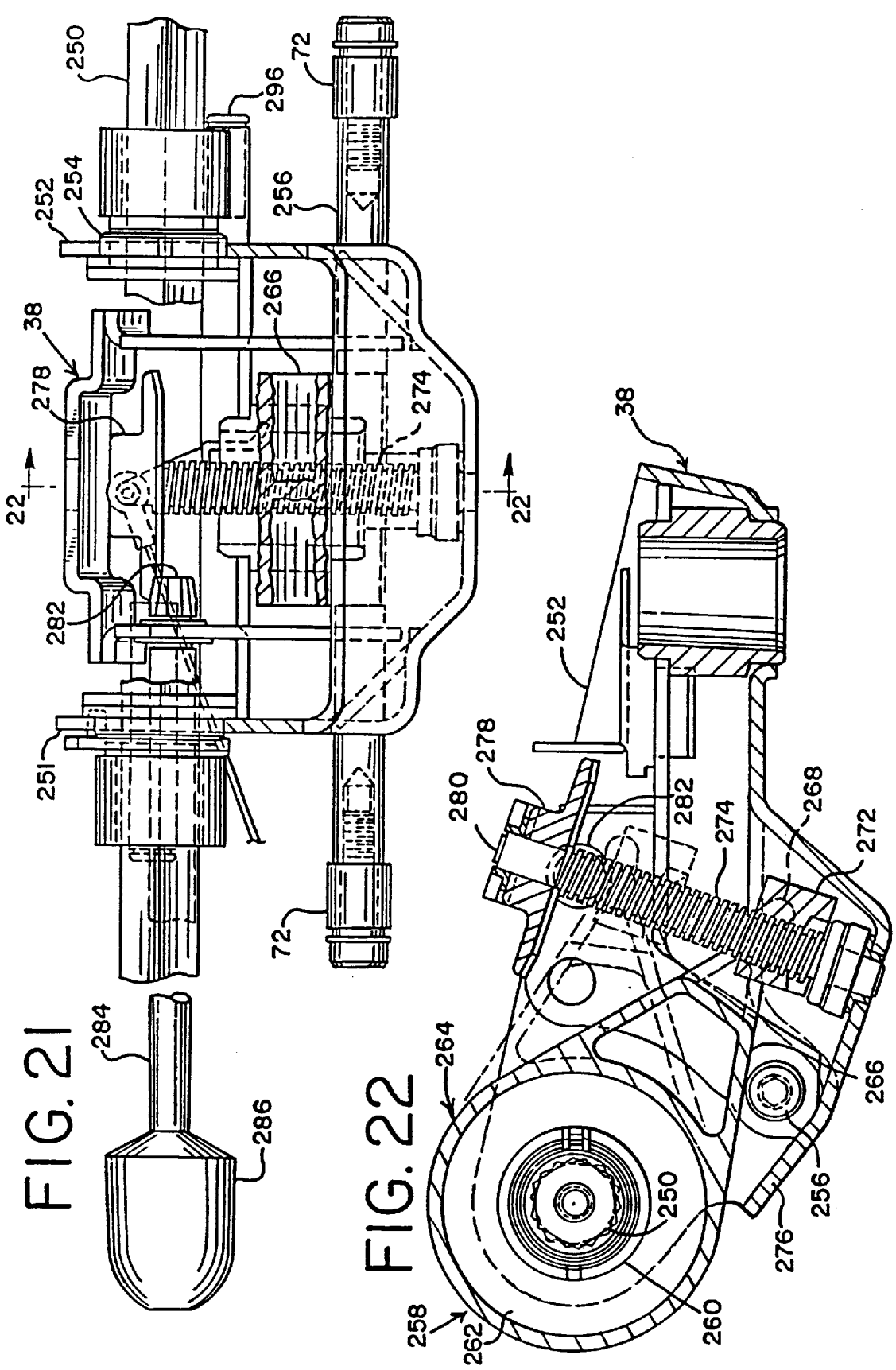

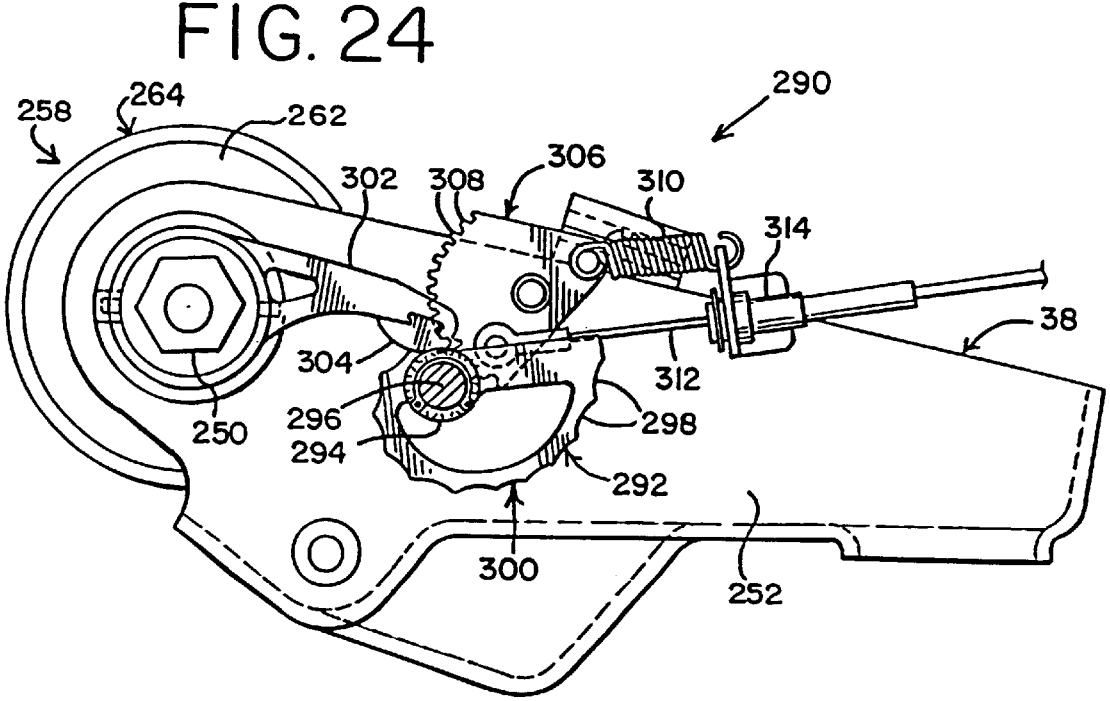
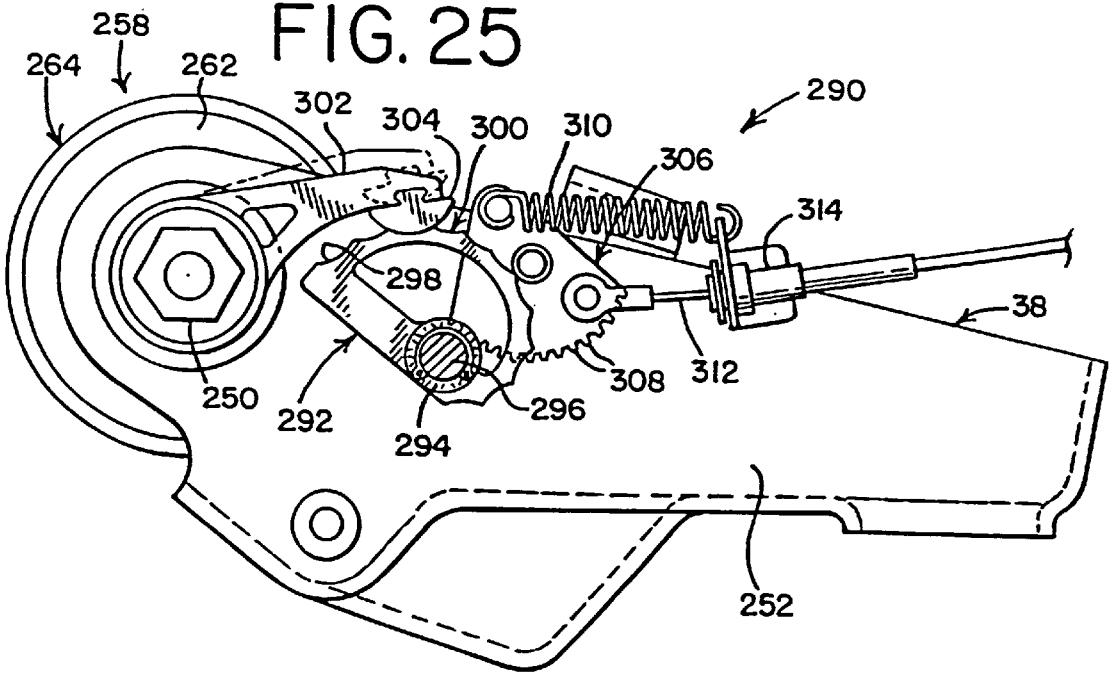

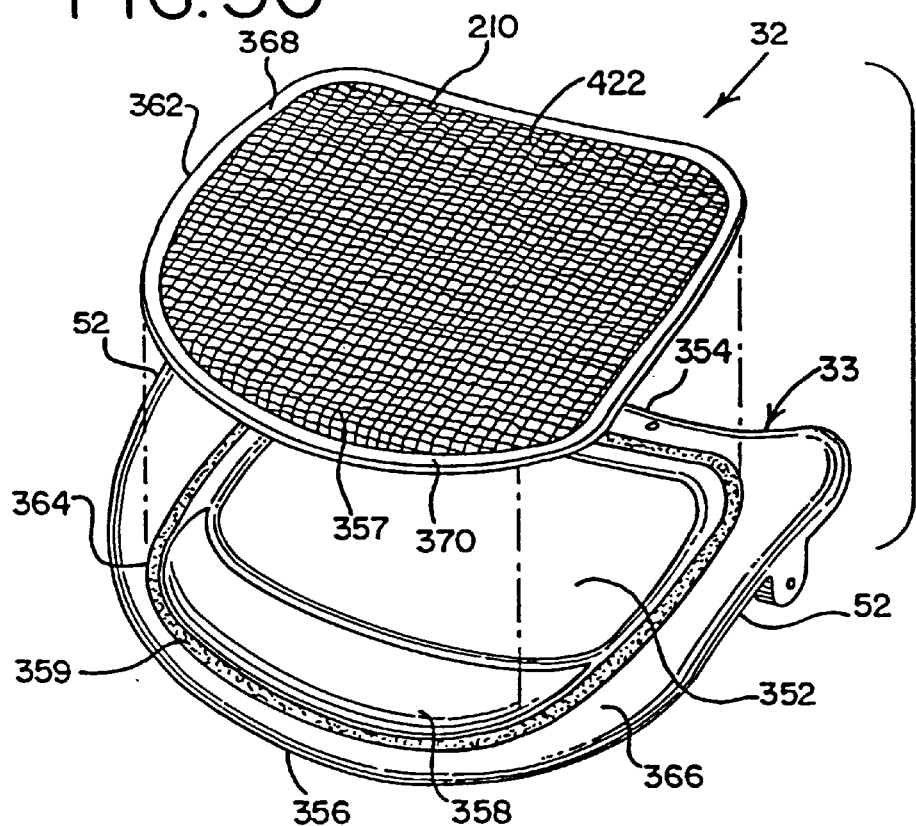
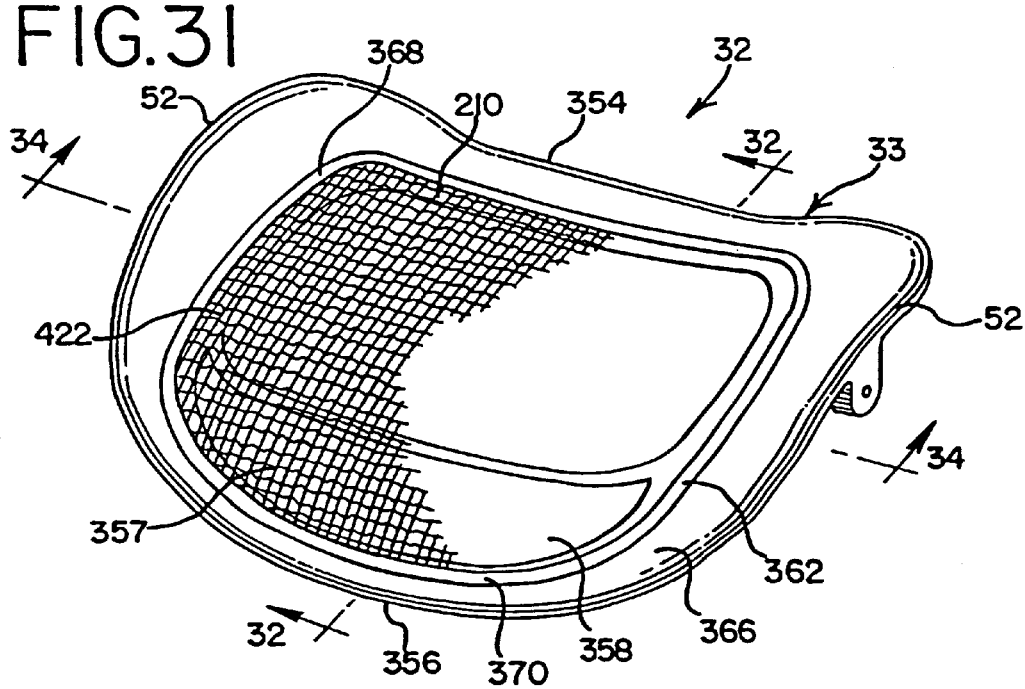

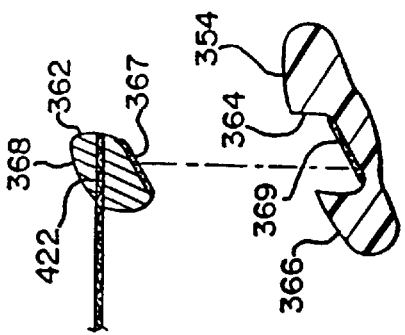
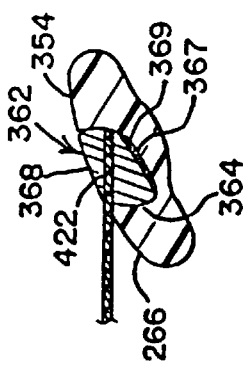
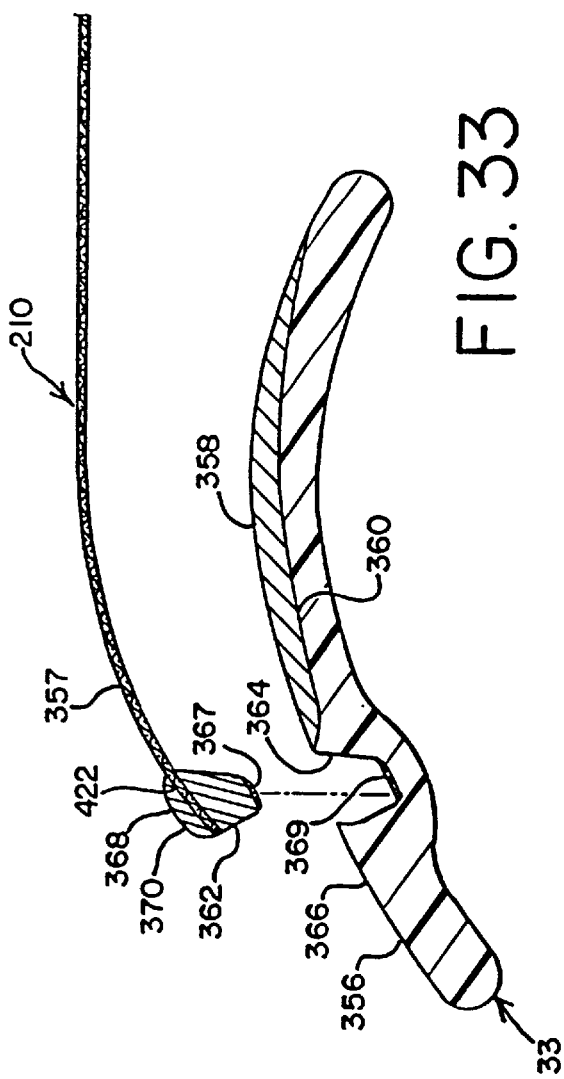
FIG. 33
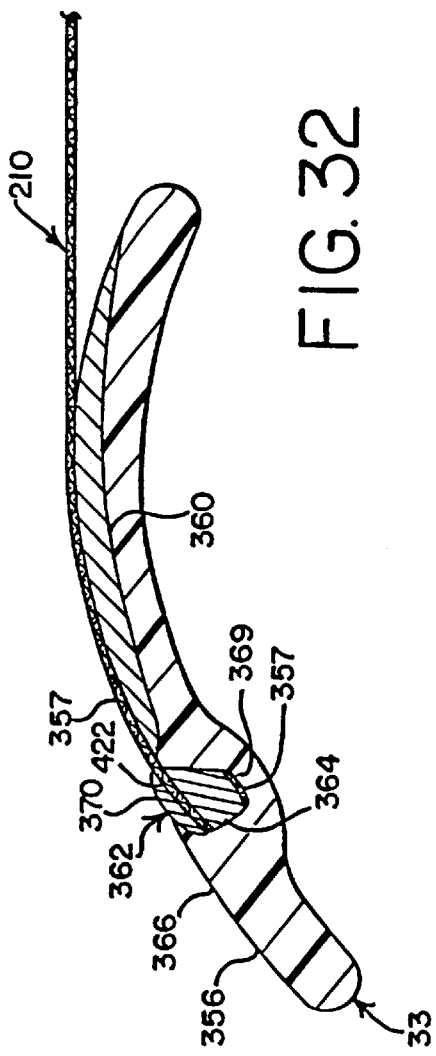
FIG. 32

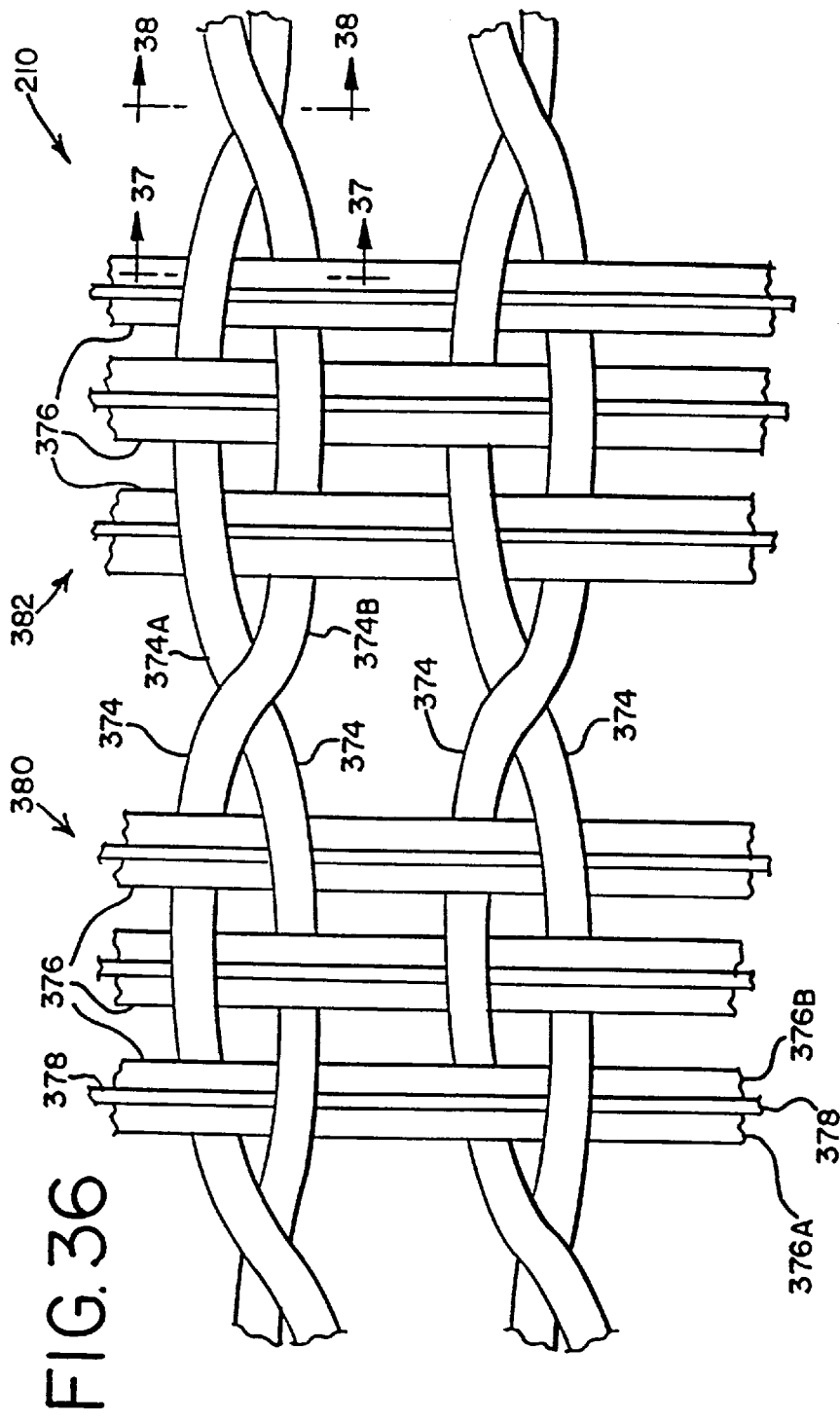
FIG. 36
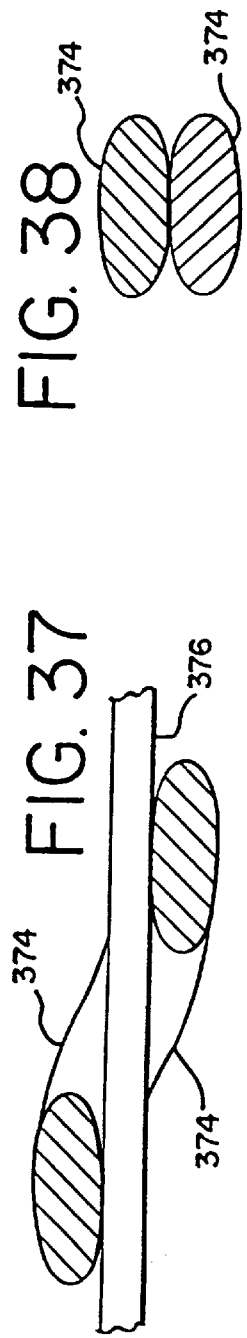
FIG. 38
FIG. 37

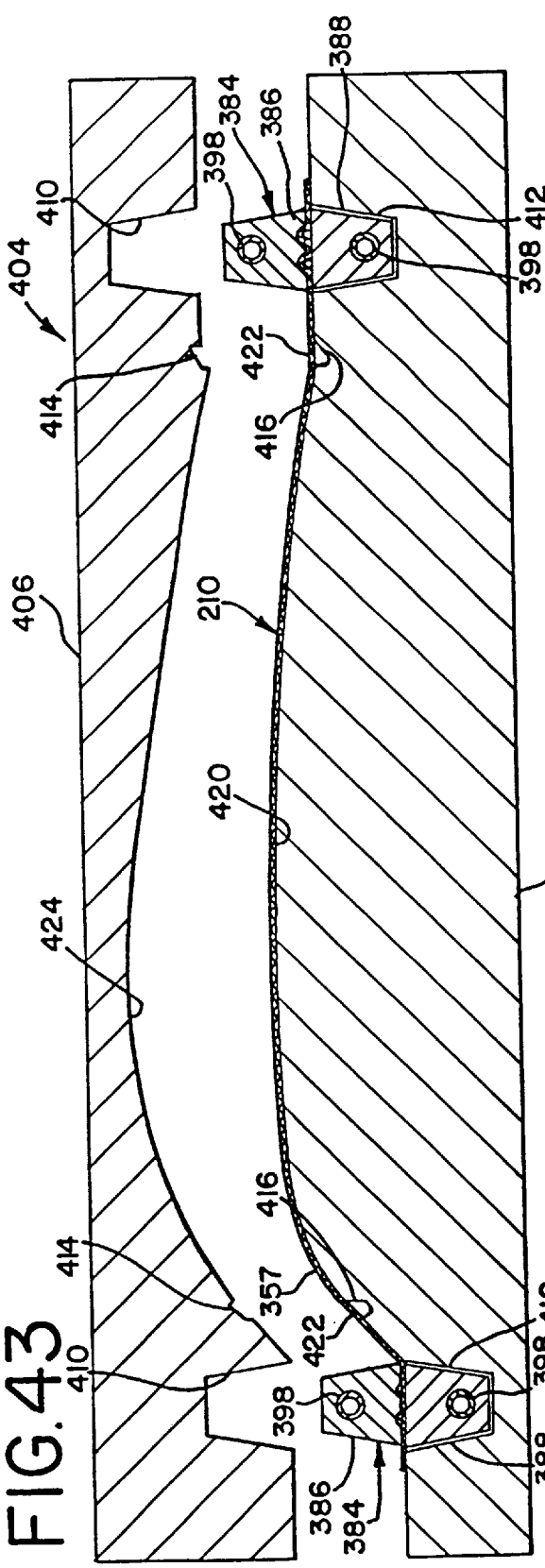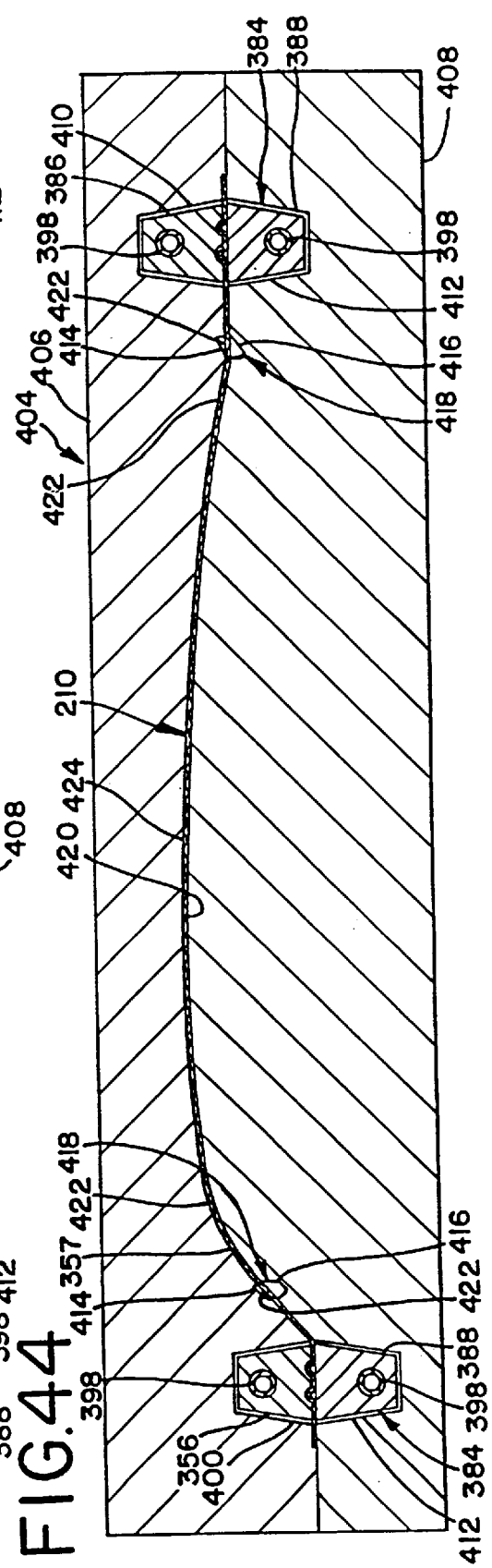

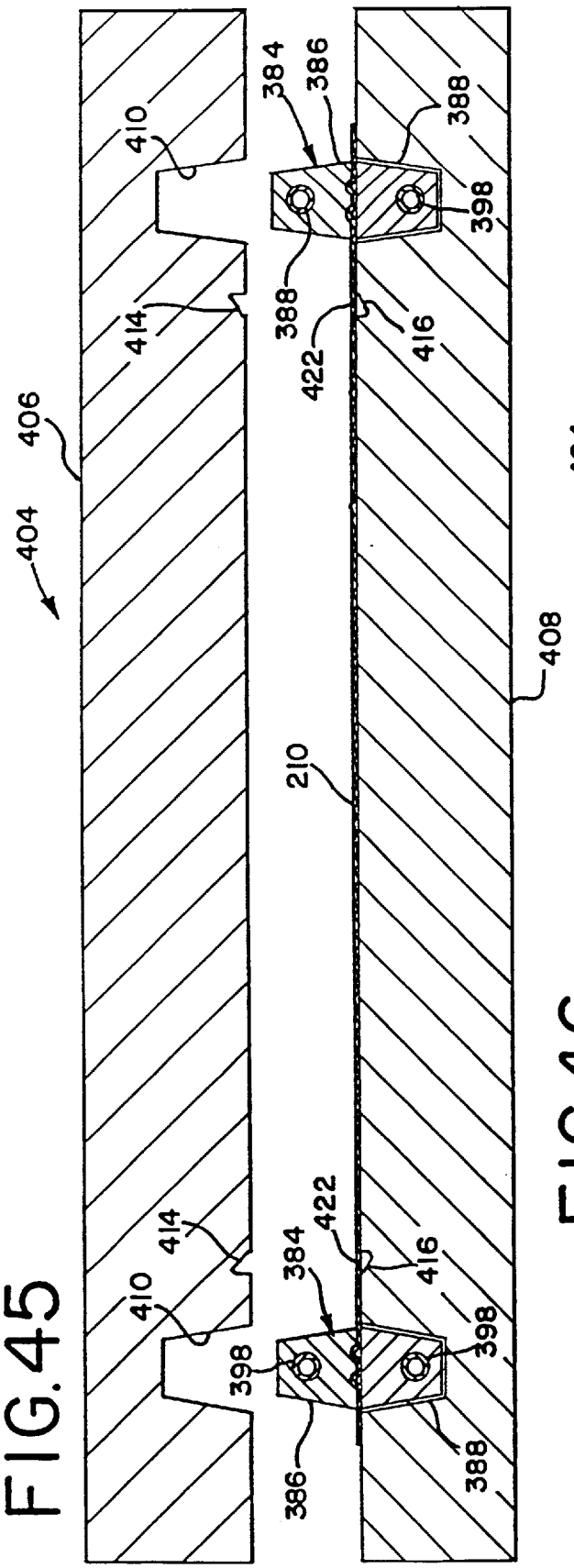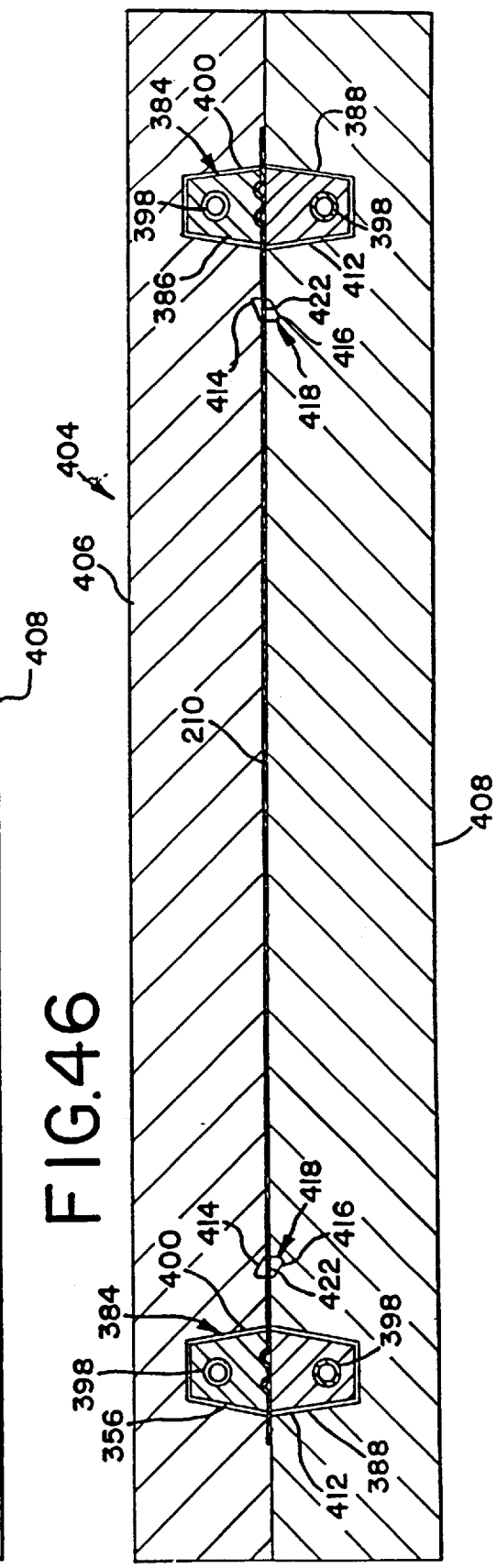

FIG. 49
FIG. 50
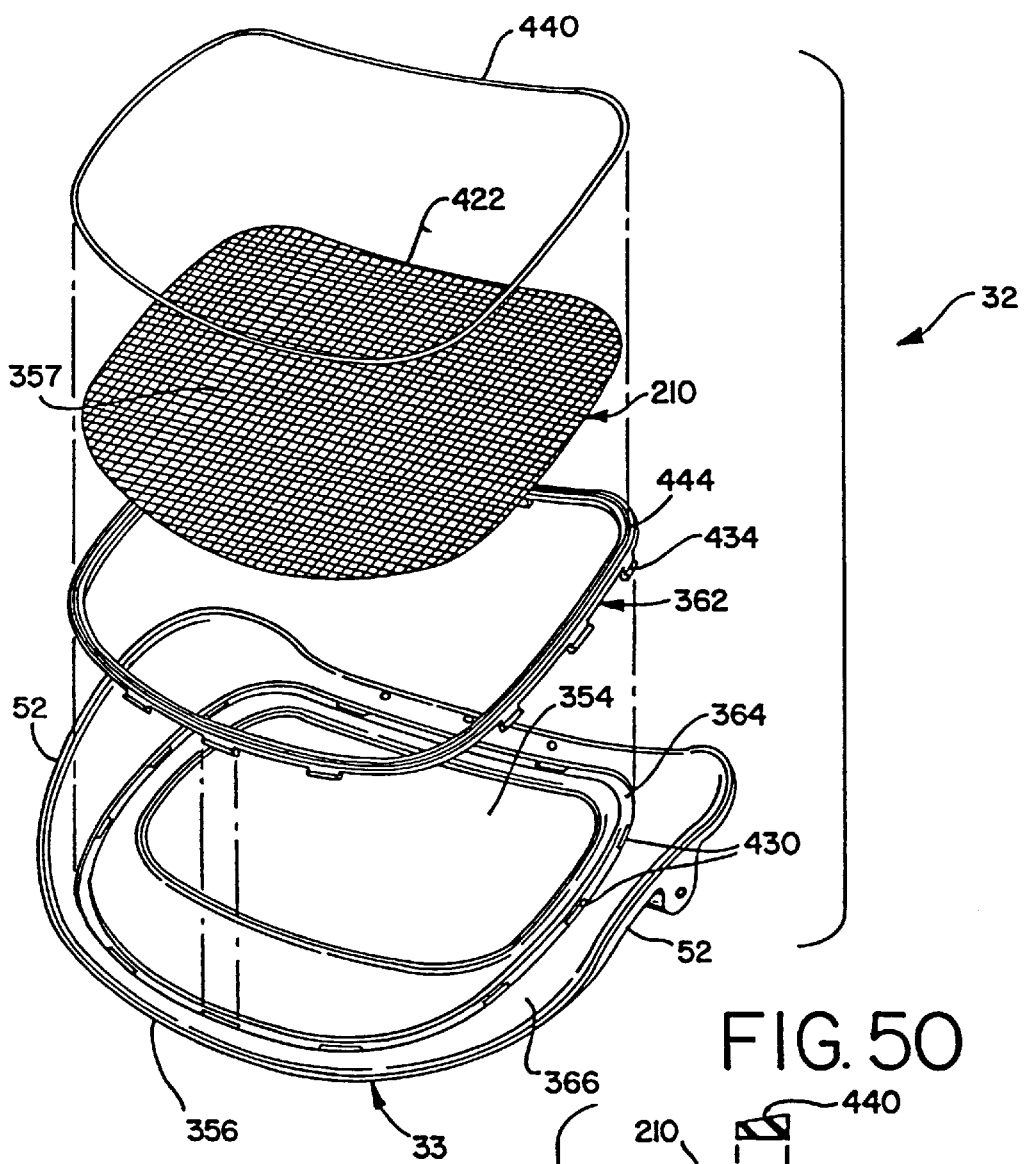
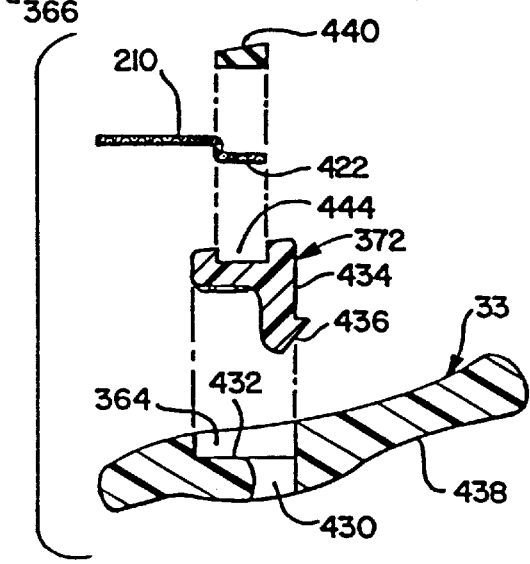

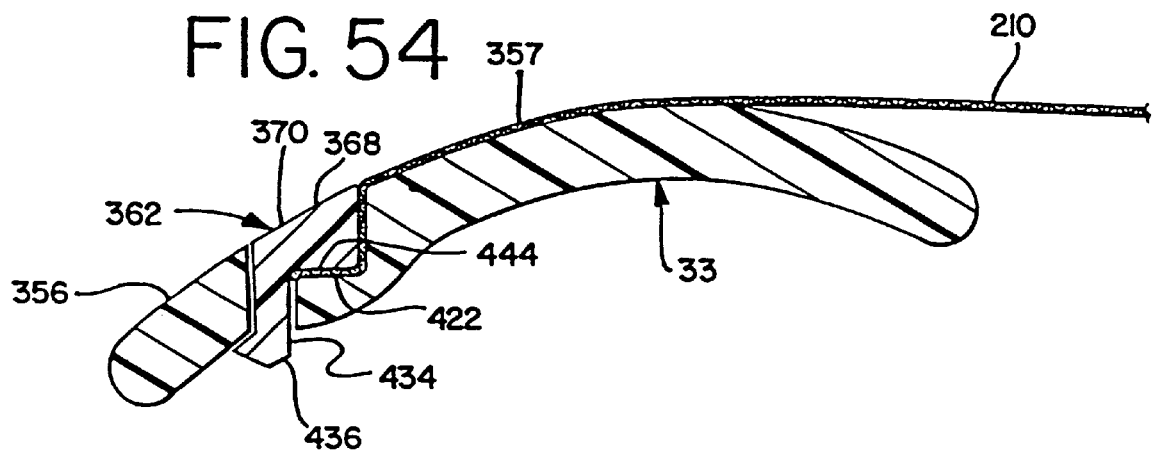
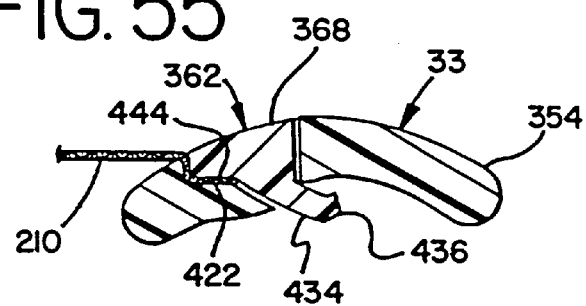
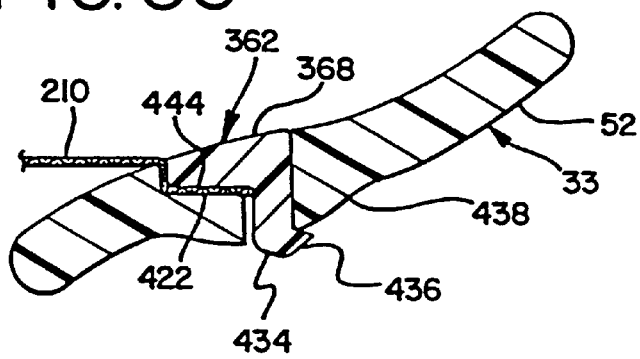

BACKREST

RELATION TO OTHER APPLICATIONS

This application is a continuation of U.S. patent application Ser. No. 08/347,475, filed Nov. 17, 1995, now U.S. Pat. No. 6,386,634, which was the National Stage of International Application No. PCT/U593/05731, filed Jun. 15, 1993, which is a continuation-in-part of Ser. No. 07/898,907, filed Jun. 15, 1992 now abandoned, the entire disclosures of which are incorporated herein by reference.

BACKGROUND OF THE INVENTION

The present invention relates generally to office chairs, and more particularly, to a height-adjustable, tiltable office chair which supports the body of a user in ergonomically desirable positions for performing various tasks.

Office chairs are typically configured to allow tilting of the seat and backrest as a unit or tilting of the backrest relative to the seat. In chairs having a backrest pivotally attached to a seat in a conventional manner, the movement of the backrest relative to the seat can create shear forces acting on the legs and back of the user. These shear forces tend to cause an uncomfortable pulling of the user's clothing. In an attempt to compensate for these shear forces, some office chairs include a backrest which pivots while the seat tilts, such as those disclosed in U.S. Pat. Nos. 2,859,801 (Moore) and 4,429,917 (Diffrient). To provide a chair which naturally conforms to the pivotal movement of both the legs and trunk of a user between tilt positions, it is desirable to provide a chair having a seat and backrest which pivot generally about the axis of the hip joints of the user.

To further ensure comfortable tilting between tilt positions and enhance the comfort of a user while in a given tilt position, it is desirable to provide a chair having a tilt mechanism with an effective pivot point about the ankles of the user. Such an ankle tilt feature decreases the effort required to tilt the chair, reduces the pressure of a forward edge of the seat acting on the underside of a user's leg, and allows the feet of the user to remain flat on a floor.

Although some tilting chairs have incorporated such an ankle tilt feature, none have comprehensively addressed the overall body posture and relative positioning of body parts for ensuring comfort and minimizing fatigue regardless how intensely a user works. In most office environments, a worker performs several tasks such as writing at a desk, dictating, using the telephone, or typing at a video display terminal (VDT). Not only do such tasks vary in the inherent intensity of the work being performed, but an individual may also desire to increase or decrease the work intensity of a given task. As a result, the optimal position of the body for ensuring comfort and minimizing fatigue also varies. Thus, it is desirable to provide a chair which automatically supports the body parts of a user in ergonomically optimal positions for performing intensive, moderate, or relaxing modes of work. It is also desirable to provide adjustable armrests for positioning the arms of a user in optimal locations for various tasks regardless of the size and shape of a user.

A related disadvantage of conventional office chairs is the configuration and material of the seat and/or backrest. Such seats typically include single or multi-density foam padding with a covering such as cloth, leather or the like. This type of seating provides a deformable cushion which conforms to the user's buttocks. However, a deformable cushion does not provide a self-adjusting support which varies according to the position of the user and the tilt position of the seat. Such seating also tends to provide insufficient aeration since it acts as another layer of clothing. In chairs incorporating flexible membranes, the membranes are typically attached directly to the frame of a seat. Often the membrane is attached to the frame by wrapping edge portions of the membrane around spaced apart rods which define the frame. The membrane of such a seat is difficult to repair and/or replace since the chair would typically have to be disassembled to allow such maintenance. In addition, the structural requirements of such an attachment limits the shape and size of the frame and the membrane.

Typically, the seats of office chairs are supported by a single stage telescoping column which provides for vertical adjustment of the seat. These columns include a gas spring mounted in a telescoping tube which is slidable within a base tube. In accordance with guidelines set by the American National Standards Institute (A.N.S.I.) and Business and Institutional Furniture Manufacturer's Association (B.I.F.M.A.), conventional office chairs in the United States are typically adjustable from a seat height of about 16.0 inches from a floor to about 20.5 inches from a floor. Nevertheless, it is desirable to exceed this range of height adjustment to account for very small or large users and to accommodate the international population in general.

Typically, it is difficult to exceed this range of height adjustment with seats which tilt about the knees or ankles of a user. To offset the moments acting on single stage support columns, pneumatic manufacturers typically set a minimum overlapping distance of 2.95 inches (75 mm) between the tubes. Because such "ankle tilt" and "knee tilt" chairs have relatively large tilt housings, it is difficult to provide a lower minimum and higher maximum seat height while maintaining the required overlapping distance between the tubes. These types of tilting chairs also impart a greater moment on the tubes since the pivot axis is offset from the support column. It is therefore desirable to provide a vertically adjustable support column having a greater overlapping distance to permit a greater stroke which decreases the minimum height and increases the maximum height of a chair seat.

SUMMARY OF THE INVENTION

Briefly stated, the invention is directed to an office chair having a seat, a back and a pair of armrests which support the body of a user in ergonomically desirable positions for performing various tasks.

In one aspect of the invention, a linkage assembly is adapted to allow the seat and back to tilt downwardly and rearwardly and to allow pivotal movement of the seat about a pivot axis in substantial alignment with the hip joints of a user to inhibit shear forces from pulling the clothing on the body of a user.

In another aspect of the invention, the linkage assembly is adapted to allow the seat and back to tilt downwardly and rearwardly such that the seat pivots about an effective pivot point at substantially the ankle of a user having feet resting on a floor.

In yet another aspect of the invention, a vertically adjustable column includes an outer guide tube, an intermediate telescoping tube slidably positioned within the outer guide tube, and an inner telescoping tube slidably positioned within the intermediate tube. The outer guide tube is mounted to a support stand and the inner tube has an upper portion thereof connected to a seat support member. A gas spring is provided and includes a cylinder mounted within the inner tube, a piston rod extending outwardly from the cylinder and having an end connected to a bottom portion of the outer guide member, and a control pin assembly mounted to an upper portion of the cylinder for operable engagement with an actuator member. The piston rod is extensible between a collapsed position in which the cylinder and inner tube are substantially within the intermediate tube and the intermediate tube is substantially within the outer guide tube, and a raised position in which a portion of the cylinder and inner tube extend outwardly from the intermediate tube and a portion of the intermediate tube extends outwardly from the outer guide tube.

In another aspect of the invention, the seat and back of the chair include a frame member having an central opening therethrough and a receptacle formed around the perimeter thereof. A membrane of elastic material covers the central opening and is adapted to be attached to a carrier member which fits inside the receptacle.

In yet another aspect of the invention, a pair of armrests are adapted to be mounted to the chair to allow pivotal movement thereof in a plane substantially perpendicular to the general plane of the back to accommodate the angle at which the forearms of a user are positioned.

In a preferred embodiment of the invention, the linkage assembly includes a pair of first links having an end pivotally attached to the lateral portions of the seat to define a pivot axis in substantial alignment with the hip joints of a user. A pair of second links have a first section rigidly connected to the first links and the back and a second section angled downwardly from the first section. The second section terminates in an end pivotally mounted to a forward portion of the base member. A restraining link has one end pivotally attached to a rear portion of the seat and another end pivotally attached to the base member to limit tilting of the seat. The first links, second links, and restraining links are configured to create an effective pivot point of the seat at substantially the ankles of a user having feet resting on a floor. Thus, the seat pivots about the hip axis of a user such that the angle therebetween increases as the back and seat tilt rearwardly.

The chair preferably includes a bowed section to support the lumbar region of a back of a user. The greater rearward tilting of the back relative to the seat automatically lowers the bowed section to accommodate the changing position of the lumbar region of the user.

Preferably, the chair also includes a height adjustable, flexible strap member positioned horizontally across the back at approximately the lumbar region of the back of a user. The strap member is also laterally adjustable to provide a desired tension for supporting the back of the user. The armrests are preferably adapted to tilt with the back such that the angle therebetween remains constant during tilting. Preferably, the armrests are height adjustable relative to the back frame by a pawl and rack mechanism.

In addition, the membrane of elastic material is preferably pre-stretched prior to insertion of the carrier member in the receptacle to accommodate for the contour of the body of a user. The carrier member is preferably of one-piece construction and is adapted to be press-fit in the receptacle, and the edge portion of the membrane is preferably molded with the carrier member. The carrier member can also be configured to snap-fit into the frame member receptacle, and the edge portion of the membrane can be welded to the carrier member.

The embodiments of the present invention provide significant advantages over other tiltable office chairs. For example, in the most preferred embodiment, the seat and back naturally conform to the body of a user during tilting of the chair to thereby reduce shear forces acting on the thighs and trunk of the user and minimize pressure acting on the underside of the user's thighs at the knees. This chair also automatically supports the body of the user in ergonomically desirable positions for performing tasks of varying intensity. The user's weight is distributed evenly and shifts of the center of gravity are compensated for to allow the user to maintain equilibrium and good balance. Thus, the user's body is positioned to reduce fatigue, allow proper alignment for performing various tasks, achieve maximum alertness or relaxation, and ensure overall comfort. Moreover, the range of vertical adjustment of the chair is increased to allow a lower minimum height and higher maximum height than conventional office chairs.

The present invention, together with further objects and advantages, will be best understood by reference to the following detailed description taken in conjunction with the accompanying drawings.

BRIEF DESCRIPTION OF THE DRAWINGS

FIG. 6 is a top view of the chair.

FIG. 7 is a bottom view of the chair.

FIG. 8 is a side view of the chair showing the seat and backrest in a forward tilt position.

FIG. 9 is a side view of the chair showing the seat and backrest in a reclined tilt position.

FIG. 11A is a fragmentary side view of the chair in a raised position showing a preferred embodiment of a column assembly in cross-section.

FIG. 11B is a fragmentary side view of the chair in a lowered position showing the column assembly in FIG. 11A in a collapsed position.

FIG. 12A is a fragmentary side view of the chair in a raised position showing an alternative embodiment of the column assembly in cross-section FIG. 12B is a fragmentary side view of the chair in a lowered position showing the column assembly in FIG. 12A in a collapsed position.

FIG. 13 is a cross-sectional view of yet another embodiment of the column assembly shown in FIGS. 11A and 11B.

FIG. 14 is a top view of the chair showing the armrests in various pivoted positions indicated by broken lines.

FIG. 19 is a fragmentary rear view of an alternative embodiment of the backrest and a brace member.

FIG. 20 is a cross-sectional view of the backrest and brace member shown in FIG. 19.

FIG. 21 is a front view of a tilt control mechanism with various portions removed for clarity.

FIG. 22 is a cross-sectional view of the tilt control mechanism taken along the line 22—22 in FIG. 21.

FIGS. 24 and 25 are side views of the tilt control mechanism showing a rearward tilt limiter mechanism.

FIGS. 25 and 26 are side views of the tilt control mechanism showing a forward tilt limiter mechanism.

FIG. 30 is an exploded perspective view of the seat.

FIG. 31 is a perspective view of the seat shown in FIG. 30.

FIG. 32 is a cross-sectional view of the seat taken along the line 32—32 in FIG. 31.

FIG. 33 is a cross-sectional view of the seat shown in FIG. 31.

FIG. 36 is an exploded fragmentary view of a seat membrane.

FIGS. 37 and 38 are cross-sectional views of the membrane taken along the lines 37—37 and 38—38 in FIG. 36.

FIG. 43 is a cross-sectional view of the loom member, membrane and mold members taken along the line 43—43 in FIG. 42 and showing the mold members prior to closure.

FIG. 44 is a cross-sectional view of the mold members in FIG. 43 shown closed against the loom member and membrane.

FIG. 45 is a cross-sectional view of the loom member, membrane and mold members taken along the line 45—45 in FIG. 42 and showing the mold members prior to closure.

FIG. 46 is a cross-sectional view of the mold members in FIG. 45 shown closed against the loom member and membrane.

FIG. 49 is a perspective view of an alternative embodiment of the seat.

FIG. 50 is an exploded, cross-sectional view of the seat shown in FIG. 49.

FIGS. 54–56 are cross-sectional views of the seat shown in FIG. 53 taken along the lines 54—54, 55—55, and 56—56 in in FIG. 26.

DETAILED DESCRIPTION OF THE PREFERRED EMBODIMENTS

Figure 1:
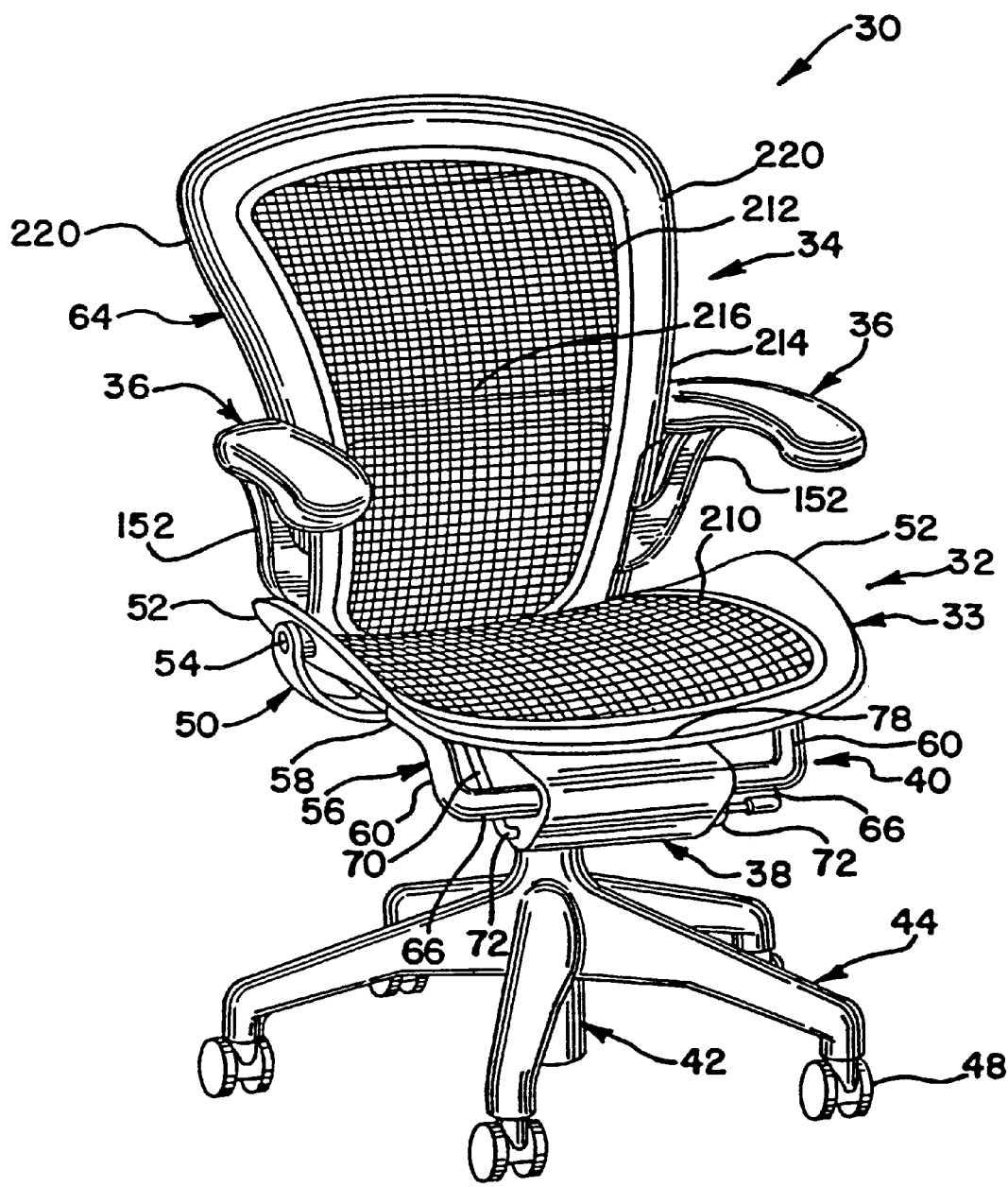
FIG. 1 is a perspective view of a preferred embodiment of a chair having a backrest, a seat, and a pair of armrests.
Figure 2:
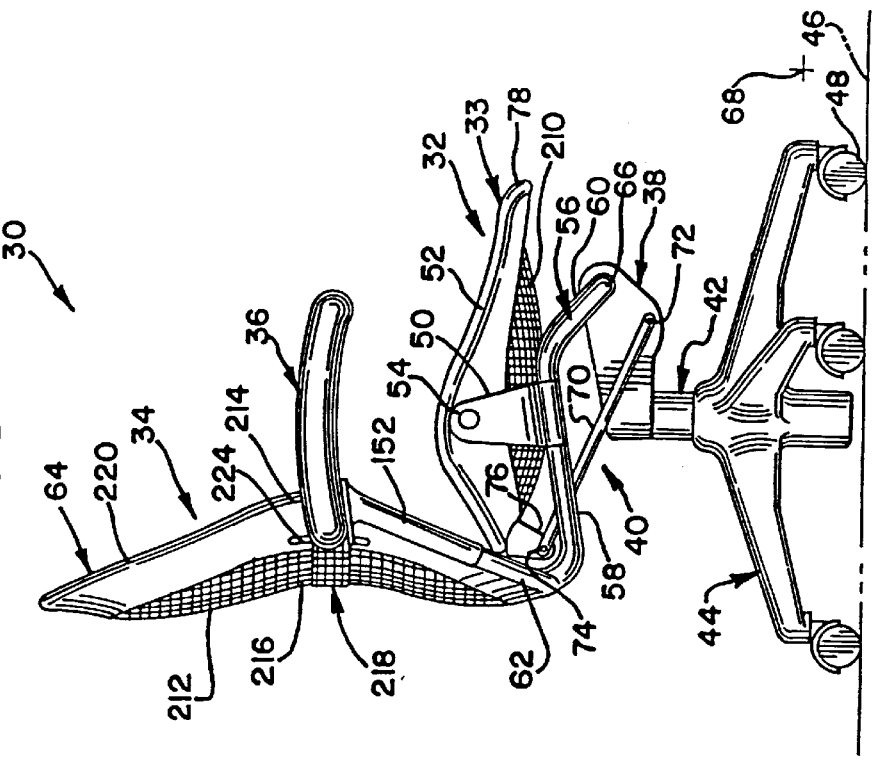
FIG. 2 is a front view of the chair.
Figure 3:
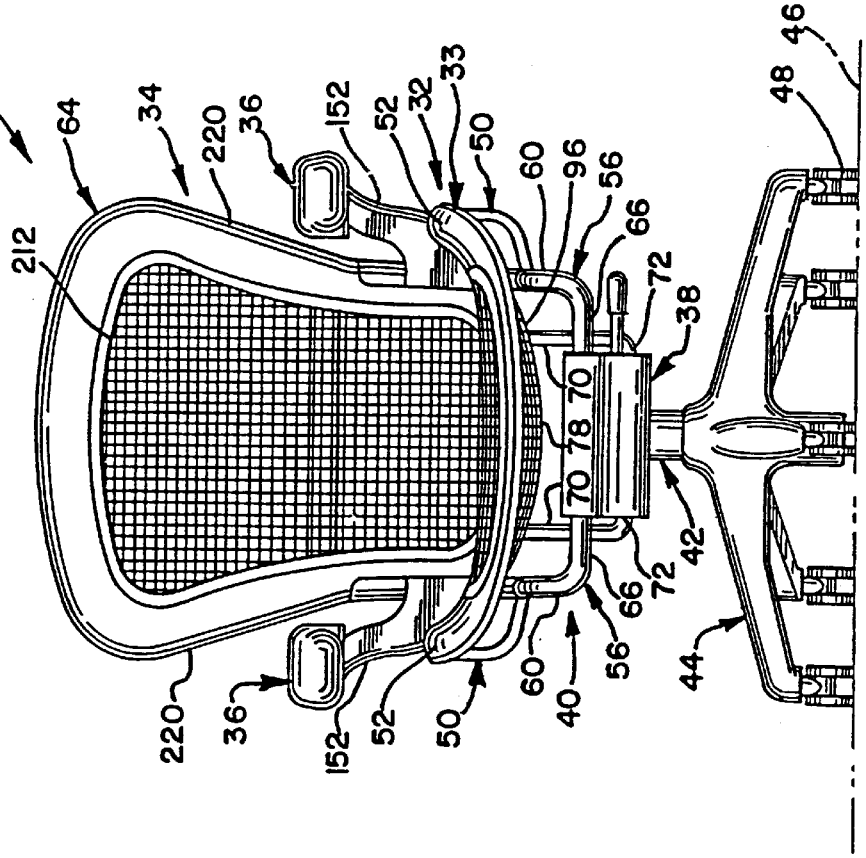
FIG. 3 is a right side view of the chair.
Figure 5:
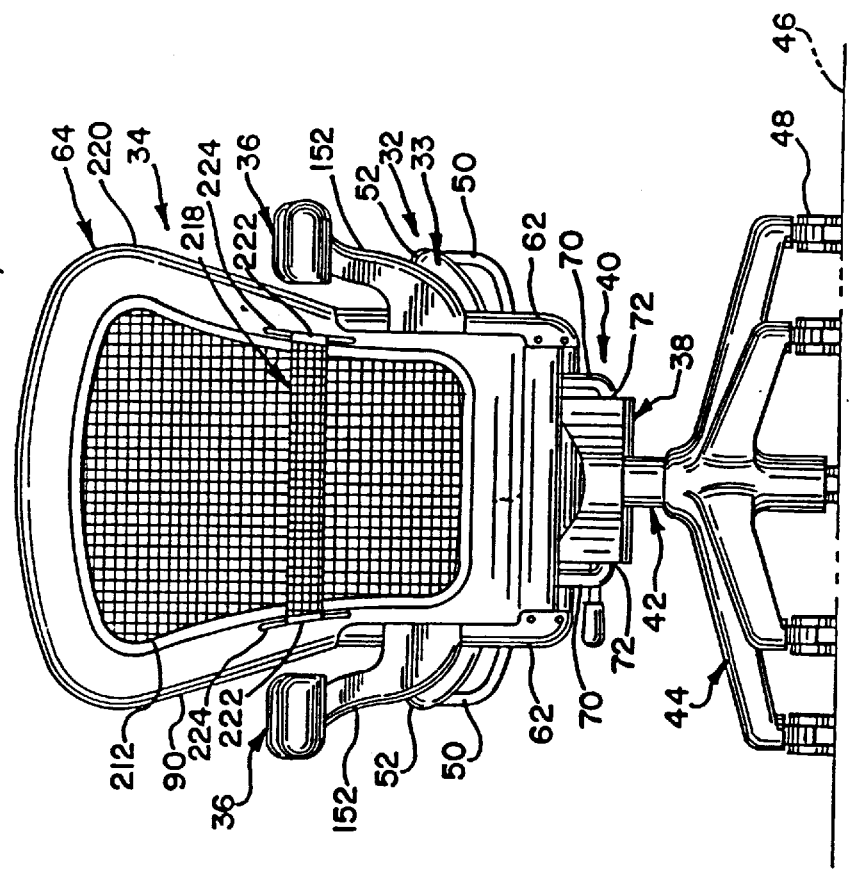
FIG. 5 is a rear view of the chair.
Figure 4:
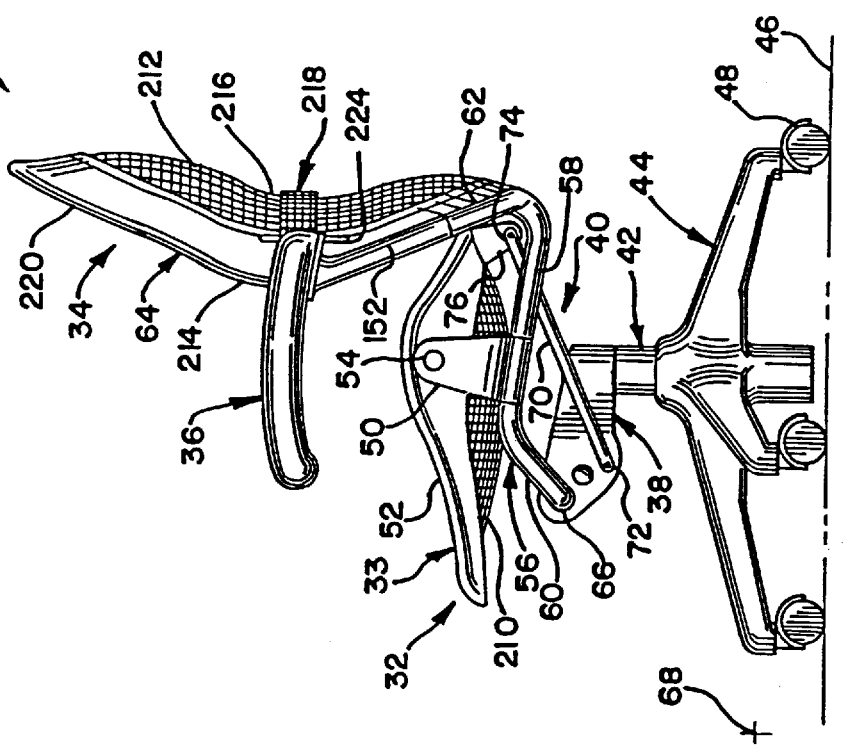
FIG. 4 is a left side view of the chair.

Referring to the drawings, FIGS. 1–7 show a preferred embodiment of a chair 30 in a middle tilt position. The chair 30 includes a seat 32, a backrest 34, and a pair of armrest assemblies 36. The seat 32 and backrest 34 are connected to a tilt control housing 38 by a linkage assembly 40. The tilt control housing 38 is mounted on a vertically adjustable, dual stage support column 42 which is secured to the center of a pedestal 44. The pedestal 44 is movably supported on a floor 46 by a plurality of casters 48 or the like.

In a preferred embodiment of the invention, the linkage assembly 40 includes a pair of first links 50 pivotally attached to upwardly extending side portions 52 of a seat frame 33 at pivot points 54 to define a pivot axis at substantially the hip joints of a user. A pair of second links 56 each have a substantially straight first section 58 to which the first links 50 are fixedly attached and a second section 60 angled downwardly from the first section 58. An upwardly extending rear end portion 62 of each first section 58 is connected to a frame 64 of the backrest 34, and an inwardly extending front end portion 66 of each second section 60 is pivotally mounted to a forward portion of the tilt control housing 38. Thus, the rigidly connected first links 50 and second links 56 act as two bars of a four bar linkage which creates an effective pivot point 68 at substantially the ankles of a user having feet resting on the floor 46.

Figure 10:
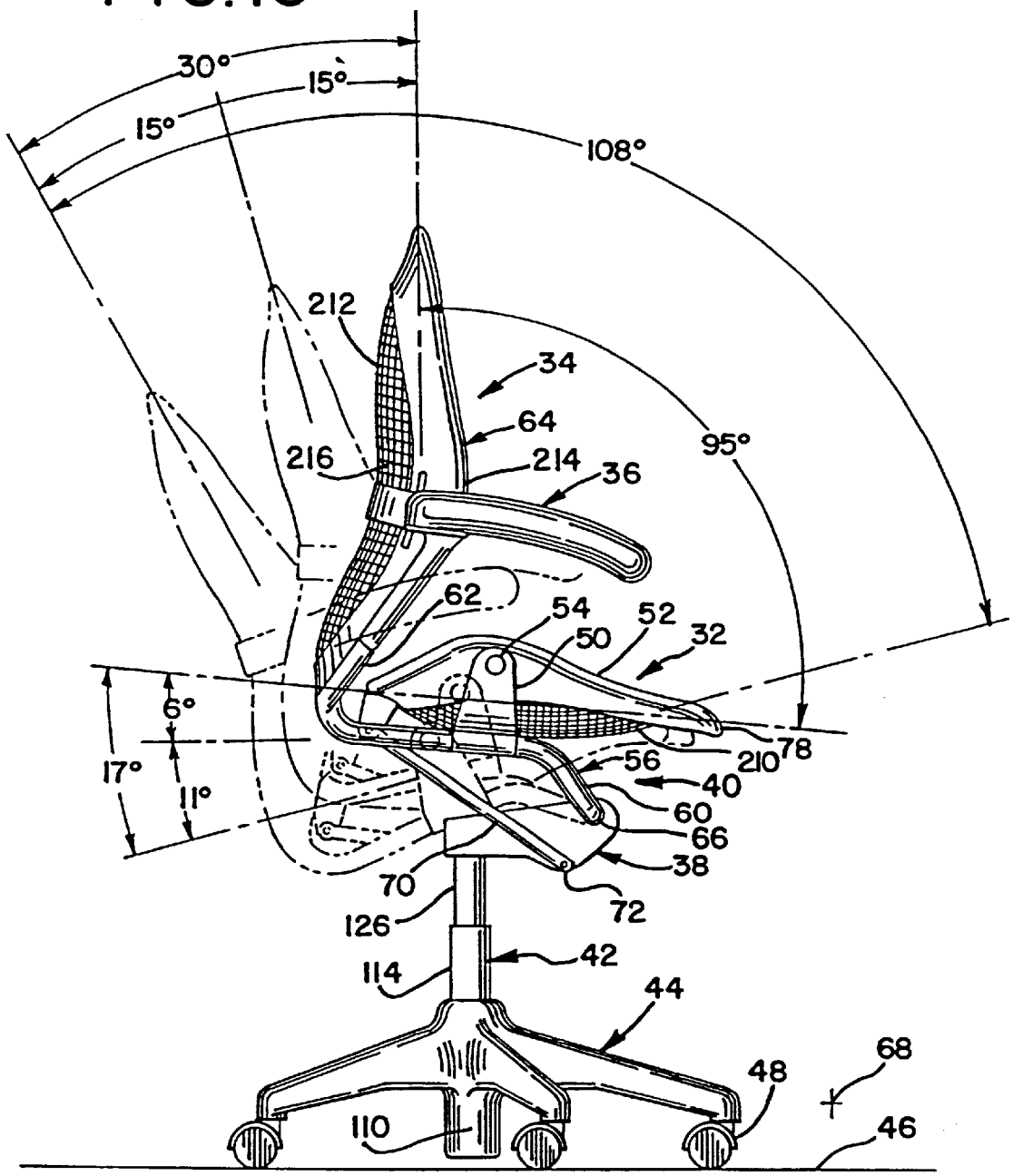
FIG. 10 is a side view of the chair showing the seat and backrest in preferred forward, middle, and reclined tilt positions.

As best shown in FIGS. 8–10, the seat 32 and backrest 34 both pivot about the hip pivot points 54 while simultaneously tilting rearwardly. To limit tilting of the seat 32, linkage assembly 40 includes a pair of restraining links 70 which form a four bar linkage in conjunction with the first links 50 and second links 56. The restraining links 70 have one end 72 pivotally attached to a front portion of the tilt control housing 38 rearwardly and below the attachment of the end portions 66 of the links 56 to the housing 38. Another end 74 of the restraining links 70 is pivotally attached to a corresponding clevis 76 extending downwardly from a rear edge of the seat 32. Thus, the seat 32 pivots about hip pivot point 54 since it is pivotally mounted to the first links 50, and the backrest 34 pivots about the same pivot point 54 since the second links 56 are fixedly connected to the first links 50. In addition, the seat 32 and backrest 34 simultaneously pivot about pivot point 66, and the restraining links 70 cause the seat 32 to pivot about the effective pivot axis 68 at the ankles of a user.

One advantage of the foregoing chair configuration is the minimizing of shear forces acting on the clothing worn on the legs and torso of the user as the user tilts between various positions. Since the legs and torso of a user naturally pivot about the hip joints, and both the seat 32 and backrest 34 pivot about the same pivot axis 54, the clothing of the user will not pull when changing tilt positions. Although such tilting of the seat 32 and backrest 34 is described in conjunction with a seat which pivots about the ankles of a user, the seat 32 and backrest 34 can be adapted to pivot about other axes. For example, the second links 56 can be configured such that a front end portion is pivotally mounted to the tilt housing assembly 38 directly above the support column 42 to provide a conventional "knuckle tilt". The second links 56 can also be rigidly attached to the first links 50 and the first links 50 can be pivotally mounted to the tilt control housing 38 at a desired location.

The comfort of a user while tilting between various tilt positions is also enhanced by the ankle tilt feature of the invention. Since the seat 32 tilts rearwardly about the ankles of a user, the user can tilt rearwardly with little effort without lifting the feet off the floor. The configuration of the linkage assembly 40 also allows tilting of the seat 32 such that a forward edge portion 78 moves rearwardly without rising a substantial amount to minimize the pressure on the underside of a user's thighs at the knees.

Another advantage of the invention is the positioning of the body of the user in ergonomically desirable postures regardless of the task being performed or the intensity at which a user works. To this end, the seat 32 and backrest 34 are tiltable between at least a forward, middle, and reclined tilt position corresponding to an intense, normal, and relaxed mode of work.

To increase attentiveness and minimize fatigue in a work intensive mode, it is desirable for the chair 30 to be tilted forwardly as shown in FIGS. 8 and 10. In this position, the seat 32 is tilted forwardly at an angle of approximately 6° from the floor 46 and the angle between the seat 32 and backrest 34 is approximately 95°. This tilt position supports the body of a user in a slightly leaning forward posture in which the user's feet are flat on the floor, the angle between the trunk and thighs is greater than 90°, the spinal centerline is approximately perpendicular to the floor 46, and the head of the user is either perpendicular to the floor or slightly bent downward and forward. The forward tilt position tends to elevate blood pressure which enhances reticulate formation of the eyes and causes a state of alertness desirable for performing work-intensive tasks. The open angle between the thighs and trunk of a user also enhances breathing to further enhance alertness.

To ensure comfort and minimize fatigue while maintaining the body in an attentive posture for normal modes of work, the chair 30 is tiltable to a middle position as illustrated in FIGS. 1–7 and shown in broken lines in FIG. 10. In this position, the seat 32 is substantially horizontal and the angle between the backrest and seat is approximately 104°. Thus, the body of user is supported in a slightly leaned back position in which the user's feet are flat on the floor, the angle between the trunk and thighs is increased, and the head of the user is perpendicular to the floor.

In a reclined tilt position (FIGS. 9 and 10), the seat 32 is tilted rearwardly at an angle approximately 11° from the floor 46 and the angle between the backrest and seat is approximately 108°. The body of a user is supported in a leaned back position in which the feet are flat on the floor and further away from the chair 30 to open up the angle between the calf and thighs of the user. The angle between the trunk and thighs of a user is increased and the head of the user remains perpendicular to the floor. The trunk of the user is also angled back to the point where a substantial weight shift occurs away from the buttocks to the spine, thereby relieving pressure and compression on the spinal discs.

To obtain the foregoing positions of the seat 32 relative to the backrest 34, the first links 50, second links 56, and restraining links 70 are configured to allow the angle between the seat 32 and backrest 34 to increase as the seat and backrest are tilted rearwardly (FIGS. 8–10). Preferably, the angle between the backrest 34 and the floor 46 increases at a greater rate than the angle between the seat 32 and the floor. To provide a desired resistance to rearward tilting of the seat 32 and backrest 34 about ankle pivot axis 68, and further to limit the tilting of the first links 50 and backrest 34 about hip pivot points 54, a tilt control mechanism such as a torsion or compression spring is positioned in the tilt control housing 38. The second links 56 are biased forwardly and upwardly by the tilt control mechanism which is described in more detail below. In addition, an adjustable rearward tilt limiter mechanism is provided to vary the maximum rearward tilting of the chair 30 and a forward tilt limiter mechanism is provided to prevent forward tilting of the seat 32 past the generally horizontal middle position shown in FIGS. 1–7. The rearward and forward tilt limiter mechanisms will be described in more detail below. A tilt lock mechanism can also be provided to lock the chair 30 in the forward, middle, and reclined tilt positions. This can be accomplished by locking the second links 56 and backrest 34 in the desired tilt position which also prevents movement of the seat 32. An example of this type of tilt mechanism is disclosed in U.S. Pat. Nos. 4,555,085 (Baker et al.) and 4,099,775 (Mizelle).

The chair 30 is also height adjustable to position the body of a various size users in ergonomically desirable positions relative to a floor and/or worksurface. The dual stage, vertically adjustable support column 42 can be incorporated in any type of chair and is not limited to the chair 30 described herein.

In FIGS. 11A and 11B, the support column 42 includes an outer guide tube 110 mounted to the pedestal 44 such that a bottom wall 112 thereof is spaced apart from the floor 46. An intermediate telescoping tube 114 is slidably positioned within the outer guide tube 110. The intermediate tube preferably 114 has an interior shoulder 116 and an exterior shoulder 118 at the middle of the tube to define a lower section 120 having a larger inner and outer diameter than an upper section 122. The lower section 120 of the intermediate tube 114 slidably bears against the outer tube 110, and when locked in a desired position, the overlapping area of the outer tube 110 and intermediate tube lower section 120 offsets any moments acting on the tubes to support a user sitting on the chair 30. To limit the upward travel of the intermediate tube 114, a retaining collar 124 is mounted to the top of the outer tube 110 and slidably receives the upper section 122 of the intermediate tube 114. In a raised position, the exterior shoulder 118 of the intermediate tube 114 bears against the collar 124 of the outer tube 110.

An inner telescoping tube 126 is slidably positioned within the intermediate tube 114 and has a top portion which is mounted to the tilt control housing 38. The inner tube 126 slidably bears against the upper section 122 of the intermediate tube 114, and when locked in a desired position, the overlapping area of the inner tube 126 and intermediate tube upper section 122 further offsets any moments acting on the tubes to support a user sitting on the chair 30. In addition, the moment acting on the tubes is minimized because an upper edge 128 of the intermediate tube 126 is closer to the tilt housing 38 than conventional support columns, thus decreasing the moment arm acting on the tubes. To limit the upward travel of the inner tube 126, a retaining collar 130 is mounted to a bottom edge of the inner tube 126 and slidably bears against the lower section 120 of the intermediate tube 114. The retaining collar 130 also carries the intermediate tube 114 therewith when the inner tube 126 moves upwardly.

To adjust the vertical position of the chair, a conventional gas spring 132 including a pneumatic cylinder 134 is mounted within the inner tube 126. A piston rod 136 extends outwardly from the cylinder 134 in an axial direction and has an end 138 connected to the bottom wall 112 of the outer guide tube 110. A control pin 140 extends upwardly from a top wall of the cylinder 134 for operable engagement with a conventional actuator member (not shown). Preferably, the actuator member is activated by a control knob on the end of a cable (not shown) which is housed on the first link 50. The piston rod 136 is extensible between a collapsed position (FIG. 12) and a raised position (FIG. 11). In the collapsed position, the cylinder 134 and inner tube 126 are substantially within the intermediate tube 114 and the intermediate tube 114 is substantially within the outer tube 110. In the raised position, a portion of the cylinder 134 and inner tube 126 extends outwardly from the intermediate tube 114 and the upper section 122 of the intermediate tube 114 extends outwardly from the outer tube 110.

Thus, the intermediate tube 114 provides an additional overlapping support area and decreases the moment arm which would otherwise act on the outer tube 110 to allow the tilt housing 38 and seat 32 to be raised to a greater height. The additional height obtainable by the tilt housing 38 and seat 32 because of the intermediate tube 114 also decreases the required height of the outer tube 110. As a result, the chair 30 can be lowered to a lower as well as a higher position than conventional chairs. Preferably, the distance between the floor 46 and the bottom wall 112 of the outer tube 110 is approximately ½ inch and the height of the outer tube 110 is approximately 8½ inches to allow the tilt housing 38 to be lowered to a height of approximately 9 inches from the floor. Moreover, the stroke of the piston rod 136 is preferably about 7 inches to allow the tilt housing 38 to be raised to a height of approximately 16 inches from the floor.

FIGS. 12A–13 illustrate alternative embodiments of the support column 42. Since these embodiments are similar to the previously described embodiment, similar parts appearing in FIGS. 12A–13 are represented by the same reference numerals. Referring now to FIGS. 12A and 12B, the intermediate tube 114, preferably made of steel, is substantially cylindrical and radially spaced from the outer tube 110 and inner tube 126. To guide and support the intermediate tube 114 within the outer tube 110, a bushing 124 extends radially inward from a top portion of the outer tube 110, and a lower bushing 111 extends radially outward from a bottom portion of the intermediate tube 114. Thus, the bushing 124 slidably bears against an exterior surface 113 of the intermediate tube 114 and the lower bushing 111 slidably bears against an interior surface 115 of the outer tube 110 when the intermediate tube 114 moves axially within the outer tube 110. When a user sits on the chair, the distance between the load-bearing bushings 111 and 124 defines a moment arm which acts to offset any moments acting on the intermediate tube 114. To limit upward movement of the intermediate tube 114 within the outer tube 110, a first spacer 117, preferably in the form of an annular band, is positioned between the outer tube 110, intermediate tube 114, and bushings 111 and 124. As illustrated in FIG. 12B, the first spacer 117 preferably fits loosely between the tubes 110 and 114 so that it remains seated on the intermediate tube lower bushing 111 as the bushing moves downwardly with the intermediate tube 114.

The inner telescoping tube 126 is likewise radially spaced from the intermediate tube 114 and is preferably cylindrical and made of steel. To support and guide the inner tube 126 within the intermediate tube 114, a bushing 130 extends radially outward from a bottom portion of the inner tube 126, and an upper bushing 119 extends radially inward from a top portion of the intermediate tube 114. To guide the inner tube 126 within the intermediate tube 114, the inner tube bushing 130 slidably bears against an interior surface 121 of the intermediate tube 114 and the intermediate tube upper bushing 119 slidably bears against an exterior surface 123 of the inner tube 126. Thus, the distance between the load-bearing bushings 119 and 130 defines a moment arm which acts to offset any moments acting on the inner tube 126. To limit the upward travel of the inner tube 126, a second spacer 125, preferably in the form of an annular band, is positioned between the inner tube 126, intermediate tube 114, and bushings 130 and 119. As shown in FIG. 12A, the maximum height of the chair is limited by the height of the first and second annular spacers 117 and 125 which bear against the bushings 111, 119, 124 and 130.

Therefore, the overlapping distance between the tubes 110, 114 and 126, or more particularly, the distance between the load-bearing bushings 111, 119, 124 and 130 provides more lateral support than conventional columns. As a result, the tilt housing 38 and seat 32 can be raised to a greater maximum height and lowered to a lower minimum height. Moreover, the embodiment of column 42 is less costly than conventional support columns which typically have a single telescoping tube slidably bearing against a sleeve which is mounted within a top portion of the outer tube. A relatively tight tolerance must be held between the sleeve and the telescoping tube in these columns to prevent any angular movement or swaying of the tube. Because the present invention utilizes a plurality of spaced apart, load bearing bushings positioned at the ends of the tubes, the tendency for the intermediate tube 114 and inner tube 126 to sway is reduced, thus obviating the need for such a tight tolerance.

Another aspect of the embodiment shown in FIGS. 12A and 12B is a frusto-conically shaped mounting member 127 attached to an upper portion of the outer tube 110. The outer surface of the mounting member 127 has a relatively large taper and mates with a frusto-conically shaped cavity 129 formed in the pedestal or support stand 44 which also has a relatively large taper. Preferably, the cavity 129 is formed in a center portion 131 of the pedestal 44 and is defined by a hub 133 extending downwardly therefrom. The tapered mounting member 127 fits within an upper portion of the cavity 129, and a lower portion of the outer tube 110 bears against an inner wall 135 of the cavity 129 at a lower portion thereof, which provides additional lateral support for the column 42. Typically, the outer tubes of conventional support columns have a cylindrical top portion extending out of a pedestal and a slightly tapered bottom portion mounted directly to a similarly shaped cavity in the pedestal. If the bottom portion of the outer tube does not fit exactly within the cavity when assembled to the pedestal, the slight tapers may prevent the outer tube from dropping entirely within the cavity which raises the minimum height of the seat. Thus, the slightly tapered portion of conventional outer tubes typically require a tight tolerance in order to properly fit within a cavity in the pedestal. Such tight tolerances are difficult to maintain and costly. The mounting member 127 and cavity 129 obviates this problem by providing a larger taper which allows the outer tube 110 to drop entirely within the cavity 129. In addition, the outer tube 100 does not require as tight a tolerance since the upper portion is not mounted directly to the pedestal 44.

Another difficulty with conventional support columns is that the top portion of the outer tubes typically cannot be tapered since the stress acting on the bearing sleeves, which are typically mounted within the top portion of the outer tubes, tends to deform the sleeves. As discussed above, such deformation is unacceptable since a tight tolerance must be held between the sleeves and the outer tubes. As a result, the cylindrical top portions of the outer tubes often extend out of the pedestal which further reduces the minimum height of the seat. Because the column 42 does not require such tight tolerances between its components, and since a plurality of load-bearing members are movably spaced from the top portion of the outer tube 110, the frusto-conical mounting member 127 can be mounted to the top portion of the outer tube 110 without fear of deformation which could bind the tubes. As a result, the top portion of the outer tube 110 can be positioned within the cavity 129 to further reduce the minimum height of the seat 32.

FIG. 13 illustrates yet another embodiment of the support column 42 which includes a spring 142 positioned within a bottom portion of the outer guide tube 110. The intermediate tube 114 does not have an interior shoulder for engagement with a retaining bushing to raise the intermediate tube with the inner tube 126. Rather, the spring 142 engages a bottom edge 144 of the intermediate tube 114 to bias the intermediate tube upwardly.

Another aspect of the invention is the height adjustable, pivotal armrests 36. As best shown in FIG. 14, the armrests 36 are pivotal about axes adjacent side edge portions of the back. The axes are positioned for approximate alignment with the elbows of a user when the user's forearms are resting on the armrests 36 to accommodate the angle at which the forearms are positioned. The armrests 36 are mounted to the backrest frame 64 to ensure proper alignment with the forearms of a user in any tilt position.

Figure 15:
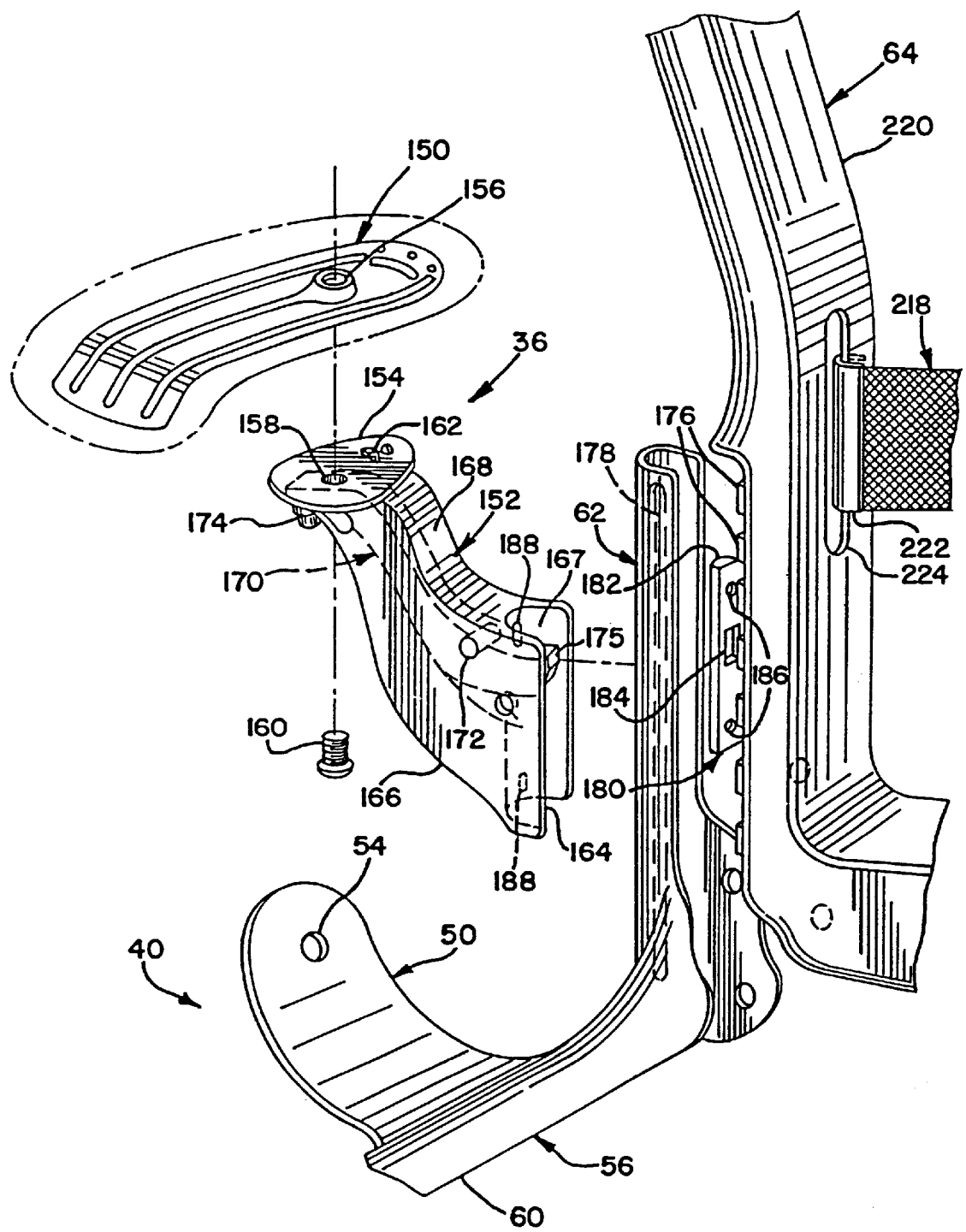
FIG. 15 is a fragmentary perspective view of the chair showing an exploded view of an armrest assembly, a backrest frame and a linkage assembly.

Referring now to FIG. 15, the armrest 36 includes a base plate 150 on which a pad is mounted and a support arm 152 having a substantially horizontal top plate 154. The base plate 150 has a threaded hole 156 therein and the top plate 154 has a hole 158 therein for receiving a threaded fastener 160 which allows the base plate 150 to pivot relative to the support arm 152. A detent member 162 extends upwardly from the top plate 154 for operable engagement with an irregular surface on the underside of the base plate 150 (not shown). The detent member 162 is biased in a direction toward the irregular surface on the base plate 150 by a spring or the like to lock the base plate 150 in a desired position. The armrests 36 are preferably pivotal approximately 20° inward and 10° outward from a vertical plane substantially normal to the general plane of the backrest 34. Thus, the armrests 36 are pivotal to a desired angle to ensure sufficient contact with the forearms of a user to accommodate various size users and to ensure proper alignment with various work devices such as narrow keyboards or the like.

Again referring to FIG. 15, the support arm 152 includes a cavity 164 defined by spaced apart side walls 166, an end wall 167 having a radius, and a top wall 168. A pawl 170 is positioned in the cavity 164 for pivotal movement about a pin 172 which extends between the side walls 166 of the support arm 152. An actuation button 174 extends downwardly from an upper end of the pawl 170 for pivoting a lower end portion 175 of the pawl 170 into and out of engagement with a plurality of teeth 176 extending outwardly from the side member 90 of backrest frame 64. The end portion 175 of the pawl 170 is normally biased toward the teeth 176 by a spring or the like. The upwardly extending rear end portion 62 of the first link 56 is rigidly mounted to the side member 90 of backrest frame 64 by conventional fasteners (not shown) and is preferably configured as a sleeve member having a vertical slot 178 therein for slidably receiving the pawl 170. A guide member 180 is positioned between the sleeve member 62 and the teeth 176 of the backrest frame side members 90. The guide member 180 has a rounded surface 182 which slidably bears against the sleeve member 62 and a slot 184 therein substantially the same size and shape as the end portion 175 of the pawl 170 for receiving the end portion 175. The guide member 180 also has a plurality of threaded holes 186 therein and the end wall 167 of the support arm 152 has threaded holes 188 therein for receiving conventional fasteners (not shown) which slidably hold the support arm 152 flush against the sleeve member 62.

In operation, the actuation button 174 is depressed to pivot the pawl 170 about pin 172 to disengage the end portion 186 from the teeth 176 on the backrest frame side member 90. The support arm 152 is slidably moved to a desired height, and the actuation button 174 is released to engage the end portion 186 of the pawl 170 with the teeth 176 and lock the support arm 152 in the new position.

Figure 16:
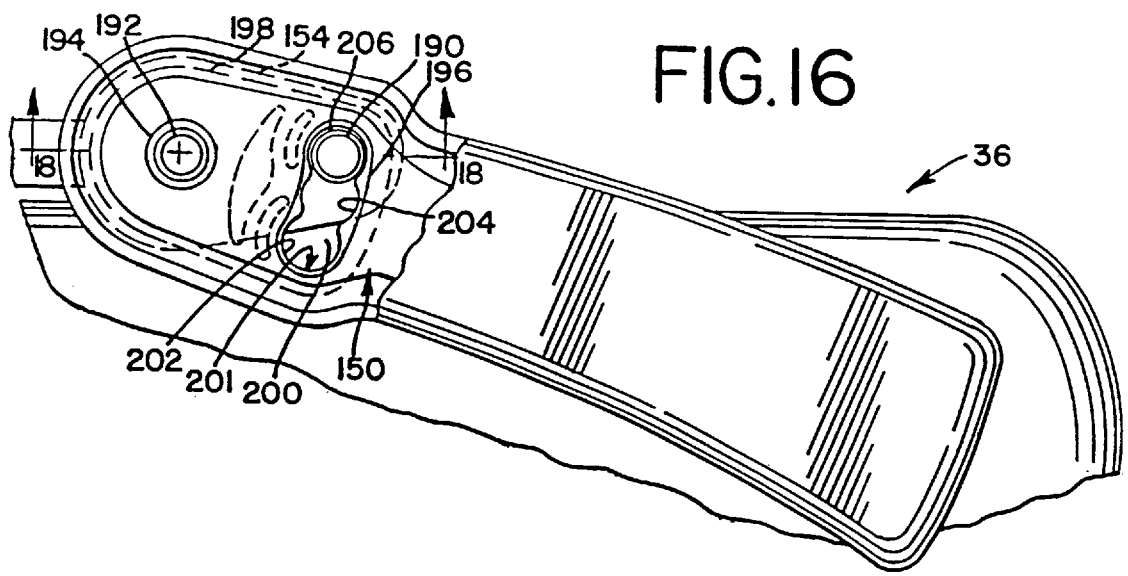
FIGS. 16 and 17 are exploded top views of an alternative embodiment of an armrest assembly.
Figure 17:
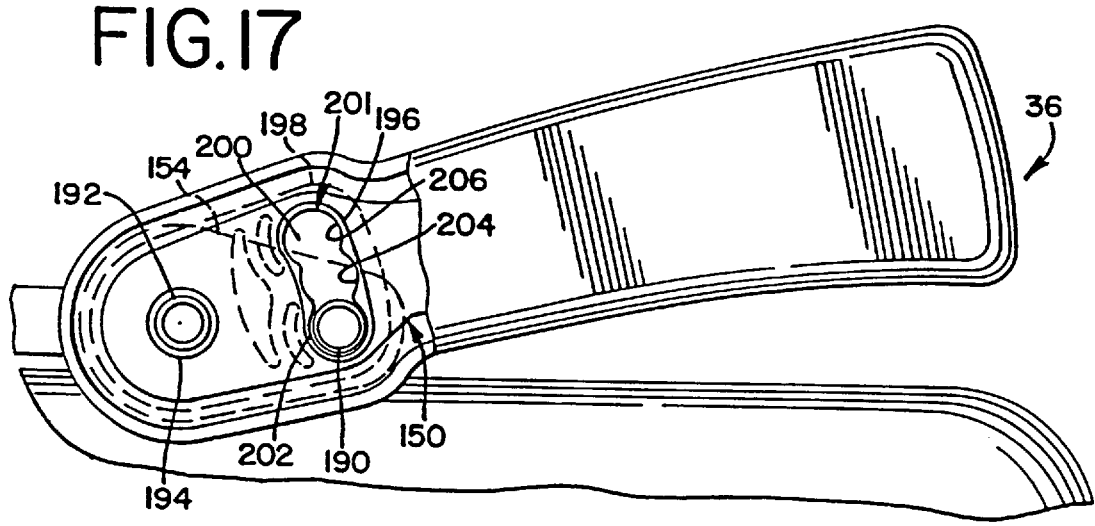
Figure 18:
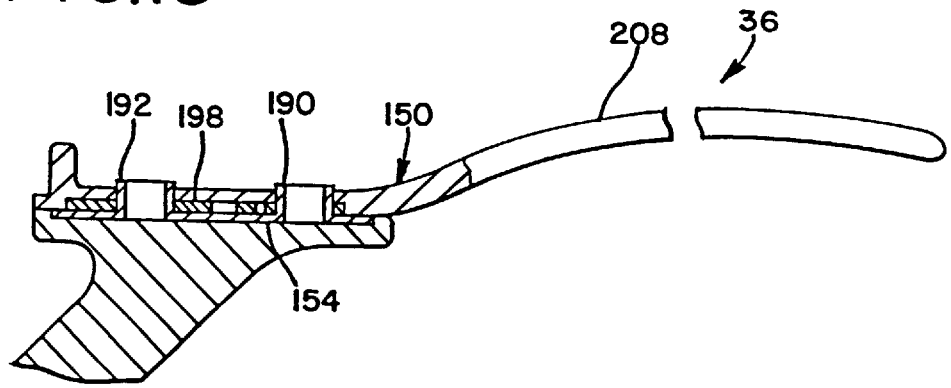
FIG. 18 is a cross-sectional view of the armrest assembly shown in FIGS. 16 and 17.

FIGS. 16–18 illustrate an alternative embodiment of the armrests 36. The top plate 154 of the support arm 152 has an index bushing 190 extending upwardly from a forward portion thereof and a pivot bushing 192 extending upwardly from a rear portion thereof. The base plate 150 has a hole 194 in a rear portion thereof for receiving the pivot bushing 192 and a curvilinear slot 196 therein which is positioned forwardly of the hole 194 for receiving the index bushing 190. The base plate 150 is pivotable about the pivot bushing 192 and the curvilinear slot 196 has a constant radius about the pivot bushing 192. To provide intermittent stops for the base plate 150, an intermediate plate 198 is positioned between the base plate 150 and the top plate 154 of the support arm 152. The intermediate plate 198 is attached to an underside of the base plate 150 and has a hole therein for receiving the pivot bushing 192. The intermediate plate 198 also has an indexed slot 200 therein which underlies the slot 196 in the base plate 150 and receives the index bushing 190. The indexed slot 200 has a centerline with the same constant radius as the slot 196. Preferably, the slot 200 is defined by an edge 201 approximating three circular portions 202, 204, and 206 having a slightly larger diameter than the index bushing 190. The circular edge portions 202, 204 and 206 are configured to retain the index bushing 190 yet allow it to pass from one circular portion to the next upon the application of a lateral force on the intermediate plate 198. Thus, the base plate 150 can be pivoted between three locked positions defined by the circular edge portions 202, 204 and 206 of the intermediate plate 198. Preferably, the index bushing 190 and circular edge portions 202, 204 and 206 are oriented to lock the base plate 150 in a first position perpendicular to the general plane of the backrest 34, a second position 20° inward from the first position, and a third position 10° outward from the first position as shown in FIG. 14. To provide other angular positions of the armrests 36, the indexed slot 200 can be provided with a desired number of circular edge portions at desired angles relative to the pivot bushing 192. In addition, the base plates 150 and cushions have a bowed portion 208 which provide a comfortable support for the user's forearms when the chair 30 is in any tilt position.

Other features of the chair 30 are provided which conform to the body of a user between tilt positions and assist in supporting the body in ergonomically desirable positions. For example, the seat 32 includes a self-adjusting elastic membrane 210 and the backrest 34 includes a similar membrane 212 for comfortably supporting the user in any tilt position. The membranes 210 and 212 and the manner in which they are attached to the seat and backrest frames 33 and 64 will be described in more detail below.

To support the lumbar region of a user's back, the frame 64 of the backrest 34 includes a bowed section 214 and the membrane 212 includes a corresponding bowed section 216. Since the angle between the backrest 34 and the floor 46 increases at a greater rate than the angle between the seat 32 and the floor as the chair is tilted rearwardly, the bowed sections 214 and 216 of the backrest 34 automatically move downwardly, preferably a distance of about 1.5 inches between the forward tilt and the reclined positions, to insure proper positioning of the lumbar support in any tilt position.

To further adjust the positioning of the lumbar support, an adjustable brace member 218 is attached to side members 220 of the backrest frame 64. The brace member 218 is positioned horizontally between the side members 220 and behind the backrest membrane 212. FIG. 15 shows one embodiment of a brace member 218 which is made of a flexible material such as woven nylon or the like. The brace member 218 includes hook members 222 received by a vertical slot 224 formed in the side members 220 of the backrest frame 64. To adjust the height of the brace member 218, a conventional fastener such as VELCRO® or the like (not shown) is disengaged to decrease the tension in the brace and allow movement of the hook members 222 within the slots 224. To reconnect the brace member 218 in a desired location and/or laterally adjust the brace member to obtain a desired tension, the fastener is tightened a desired amount.

FIGS. 19 and 20 illustrate another embodiment of the brace member 218. In this embodiment, the backrest frame 64 is angled relative to the membrane 212 so that a rear inner edge 226 of the frame 64 is spaced apart from the membrane 212. The brace member 218 is preferably oval shaped and made of a relatively soft yet semi-rigid material such as rubber or the like. As shown in FIG. 20, the brace member 218 has an inner surface 228 which bears against the backrest membrane 212. The brace member 218 is rotatably attached to the inner edge 226 of the backrest frame 64 to allow adjustment of the angle of the brace member 218. This angular adjustment stretches the membrane 212 and provides the desired location and amount of support for the lumbar region of a user's back. For example, the brace member 218 can be rotated from a standard position shown in solid lines in FIG. 20 to a different position shown in broken lines in FIG. 20. Preferably, an upper edge portion 230 and a lower edge portion 232 of the brace member 218 each have a radius which provides a comfortable surface area supporting the user's back when the brace member 218 is rotated to an angle relative to the membrane 212.

The brace member 218 is rotatably attached to the frame 64 by a pair of swivel connectors 234, 236 which are mounted to the ends of the brace member 218. The structure of the connectors 234 and 236 is substantially identical and will be described particularly only with reference to the connector 234. The connector 234 has a plurality of vertically aligned hook members 238 extending perpendicularly outward from a plate 240 for grasping the frame edge 226. A pivot rod 242 extends perpendicularly inward from the plate 240 and is received by an insert 244 in a ball and socket type arrangement. The insert 244 is mounted within a cavity 246 in the brace member 218 and has a plurality of annular ribs 248 which are received by corresponding annular grooves in the cavity to prevent axial displacement of the insert 244. The pivot rod 242 is preferably mounted within the insert 244 with sufficient frictional engagement to require manipulation of the brace member 218 in order to pivot the brace member.

Thus, an adjustable brace member 218 is provided which supports the lumbar region of a user's back a desired amount at a desired location. The connectors 234 and 236 can also be adapted for releasable attachment to the frame edge 226 to allow vertical adjustment of the brace member 218.

Figure 23:
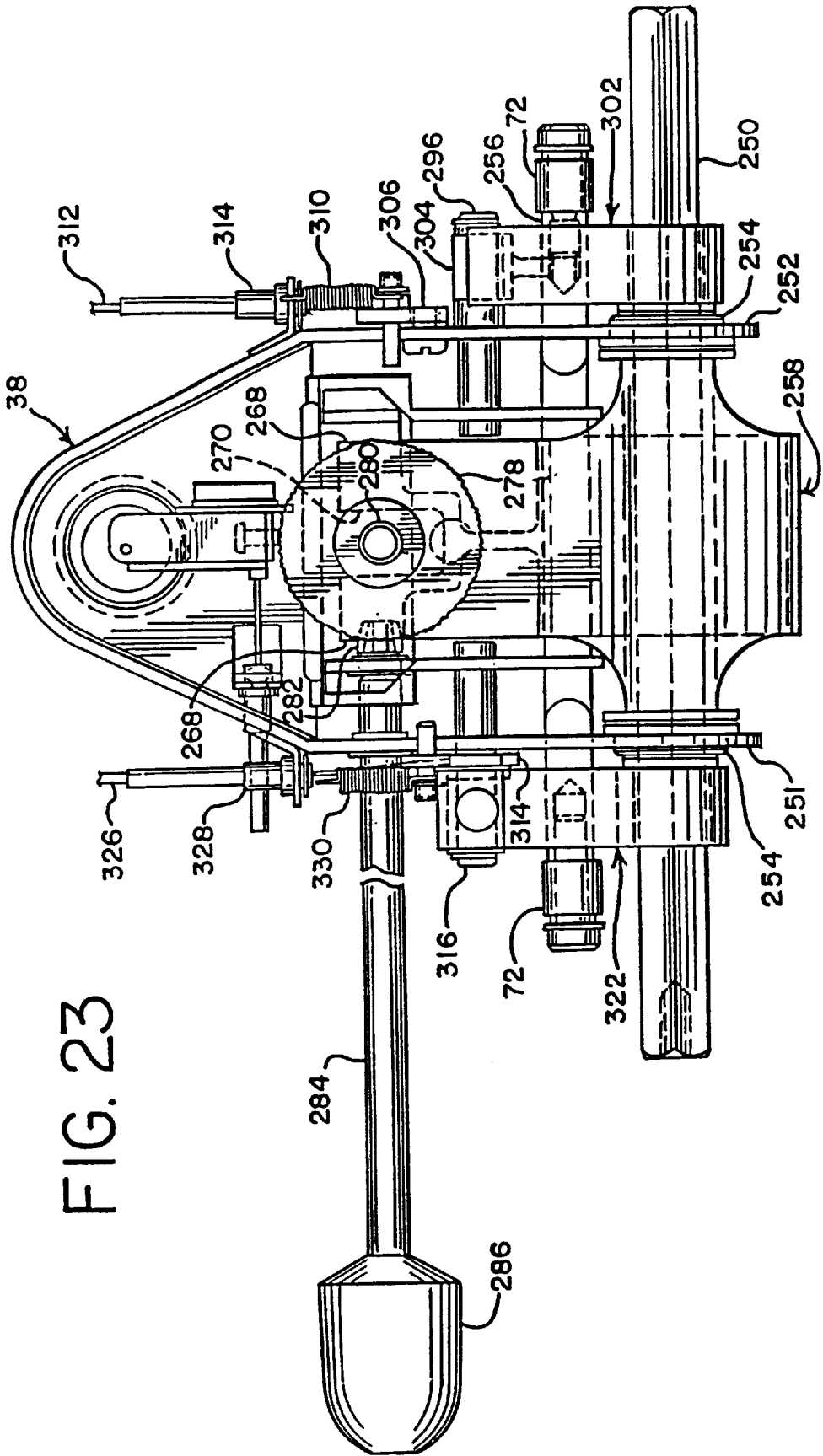
FIG. 23 is a top view of the tilt control mechanism shown in FIGS. 21 and 22 with various portions removed for clarity.

FIGS. 21–27 illustrate the tilt control mechanism of the present invention. As described above, the inwardly extending front end portions 66 of links 56 are pivotally attached to a forward portion of the tilt control housing 38. The ends 72 of the restraining links 70 are pivotally attached to the forward portion of the housing 38 rearwardly and below the attachment of the end portions 66 of links 56. Preferably, the end portions 66 of links 56 are rigidly attached to a hexagonal axle 250 which extends transversely through the housing 38 and is rotatably attached to spaced apart side walls 251, 252 of the housing 38 via a pair of bushings 254. Likewise, the ends 72 of the restraining links 70 are rigidly attached to a transversely extending bar 256 which is rotatably attached to the side walls 251, 252 of the housing 38. To provide a restoring torque against the rearward tilting of the seat 32, an elastomeric torsion spring 258 is mounted to the hexagonal axle 250. The spring 258 is mounted for twisting movement about the axle 250 to resist rotation of the axle 250 when a user sits on the seat 32. A torsion spring of this type is manufactured by the B.F. Goodrich Company and is designated as TORSILASTIC® spring. As shown in FIGS. 21–23, a bushing 260 having a hexagonal core is fixedly mounted to the hexagonal axle 250, and a molded sleeve 262 of a rubber-like elastomeric material is fixedly mounted to the bushing 260. An outer metal sleeve 264 is fixedly attached to the elastomeric sleeve 262, and an arm 266 extends radially outward from the outer sleeve 264. To provide a restoring torque against rotation of the axle 250, the arm 266 is adapted to be fixed to the housing 38. Thus, the rotation of the axle 250 resulting from a user sitting on the seat 32 causes the elastomeric sleeve 262 to twist which exerts a restoring torque against the axle 250.

The initial restoring torque exerted by the spring 258 against the rotation of axle 250 can be adjusted by changing the position of the outer sleeve arm 266. To provide easy adjustment, the outer sleeve arm 266 has spaced apart side portions 268 defining a recess 270 in the end of the arm 266. The side portions 268 operably engage a transversely oriented block member 272 which is threadably attached to a screw 274. The screw 274 is mounted to a bottom wall 276 of the housing 38 and extends upwardly through the recess 270 in the arm 266. The axis of the screw 274 is positioned generally tangentially to the outer sleeve 264, and a bevel gear 278 is attached to a top portion 280 of the screw 274. A bevel gear 282 meshes with the bevel gear 278 and has an axis which intersects the axis of the bevel gear 278. The bevel gear 282 is attached to the end of a shaft 284 which is rotatably mounted to the side wall 251 of housing 38. The shaft 284 extends horizontally outward from the side wall 251 of the housing and has a handle 286 thereon to provide easy access for a user. In operation, the shaft 284 and gear 282 are rotated a desired amount to rotate the gear 278 which in turn rotates the screw 274. Rotation of the screw 274 causes the block member 272 to move linearly along the axis of the screw 274, which moves the outer sleeve arm 266 of to the desired radial location. Preferably, the gear ratio of bevel gears 278 and 282 is such that a minimal amount of effort is required to move the arm 266. Thus, the outer sleeve arm 266 is easily moved a desired amount to vary the initial restoring torque of the spring 258 and thereby control the rate at which the seat 32 and back 34 tilts rearwardly when a user sits on the seat 32.

An adjustable rearward tilt limiter mechanism 290 is also provided to vary the maximum rearward tilting of the seat 32 and backrest 34. As best shown in FIG. 24, a cam member 292 and gear 294 are mounted to a rod 296 which is rotatably mounted to the side wall 252 of housing 38. The cam member 292 preferably has a plurality of concave surfaces 298 formed in an outer edge 300 thereof. An arm 302 is fixedly mounted to the axle 250 and has a convex follower member 304 attached to an end thereof. The arm 302 extends rearwardly from the axle 250 such that the follower member 304 is in operable engagement with one of the concave surfaces 298 of the cam member 292 when a user sits on the seat 32. As viewed in FIGS. 24 and 25, the maximum clockwise rotation of the axle 250 and therefore the maximum rearward tilt position of the seat 32 and backrest 34 is determined by the position of the cam member 292. To adjust the position of the cam member 292, a pie-shaped member 306 is rotatably attached to the side wall 252 of the housing 38. The member 306 has a plurality of teeth 308 on a circular edge portion thereof which mesh with the gear 294. A spring 310 is attached to the pie-shaped member 306 and the side wall 252 of the housing 38 to bias rotation of the member 306 in a clockwise direction. A cable 312 is attached to the member 306 opposite the spring 310 and guided within a guide member 314 which is attached to the side wall 252 of the housing 38. In operation, the cable 312 is moved axially a desired amount to rotate the pie-shaped member 306, which in turn meshes with the gear 294 to rotate the cam member 292 to a desired position. When the chair is tilted rearwardly, one of the concave surfaces 298 will act as a stop for the follower member 304 to limit the rearward tilting of the seat 32 and chair 34. As shown in dotted lines in FIG. 25, the cam member 292 and arm 302 can be rotated to lock the seat 32 and backrest 34 in a forward tilt position.

Figure 26:
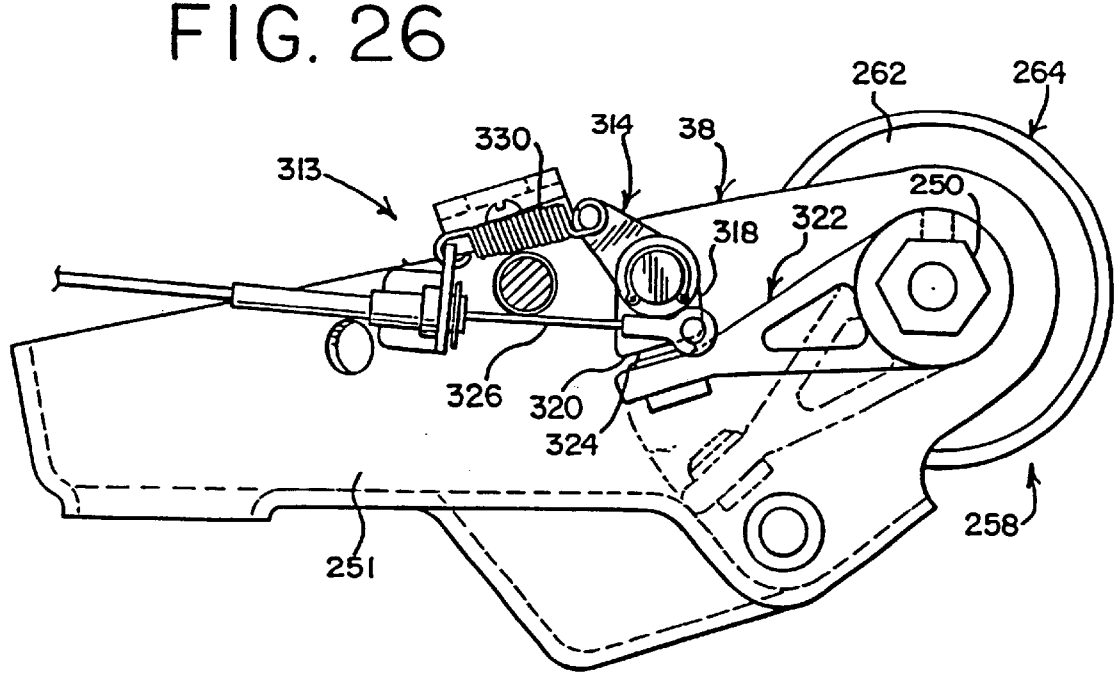
Figure 27:
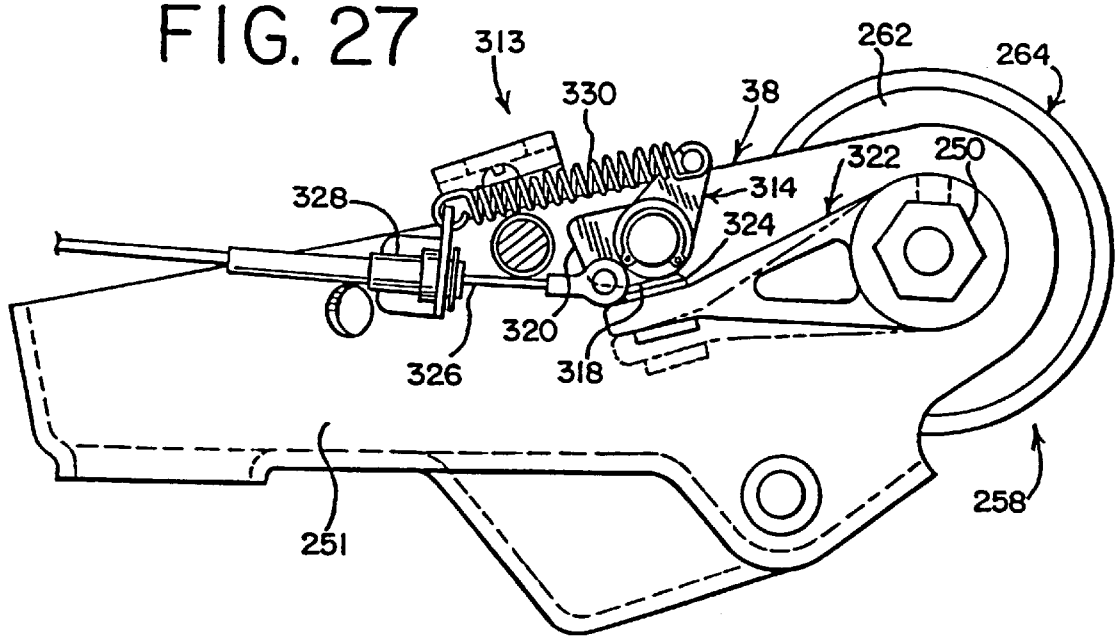

In addition, a forward tilt limiter mechanism 313 is provided to prevent forward tilting of the seat 32 past the generally horizontal middle position shown in FIGS. 1–7. As best shown in FIGS. 26–27, a pivot member 314 is mounted to a rod 316 which is rotatably mounted to the side wall 251 of housing 38. The pivot member 314 has forward tilt abutment surface 318 and a standard tilt abutment surface 320. An arm 322 is fixedly mounted to the axle 250 and has a load bearing member 324 attached to an end thereof. The arm 322 extends rearwardly from the axle 250 such that the load bearing member 324 is operably engageable with either the forward tilt abutment surface 318 or the standard tilt abutment surface 320. As viewed in FIGS. 26 and 27, the maximum clockwise rotation of the axle 250 and therefore the maximum forward tilt position of the seat 32 and backrest 34 is determined by the position of the pivot member 314. To actuate the pivot member 314 between the standard and forward tilt positions, a cable 326 is attached to the pivot member 314. The cable member 326 is guided within a guide member 328 which is attached to the side wall 251 of the housing 38. In addition, a spring 330 is attached to the side wall 251 of the housing 38 and to the pivot member 314 opposite the cable 326 to bias rotation of the pivot member 314 in a counterclockwise direction as viewed in FIGS. 26 and 27. In operation, the cable 326 is moved axially a desired amount to rotate the pivot member 314 so that the load bearing member 324 is operably engageable with the standard tilt abutment surface 320 as shown in FIG. 26 or with the forward tilt abutment surface 318 as shown in FIG. 27. When the chair is unoccupied or when a user leans forward, the pivot member 314 will act as a stop for the load bearing member 324 to limit the forward tilting of the seat 32 and chair 34.

Figure 28:
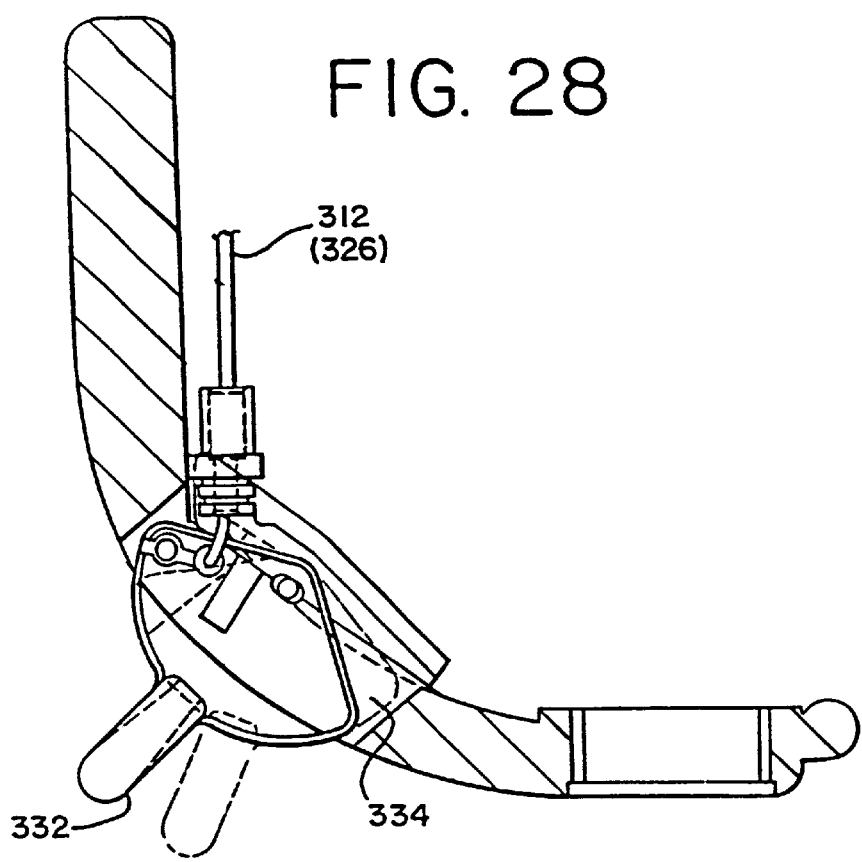
FIGS. 28 and 29 are cross-sectional views of mechanisms for actuating the tilt control mechanisms.
Figure 29:
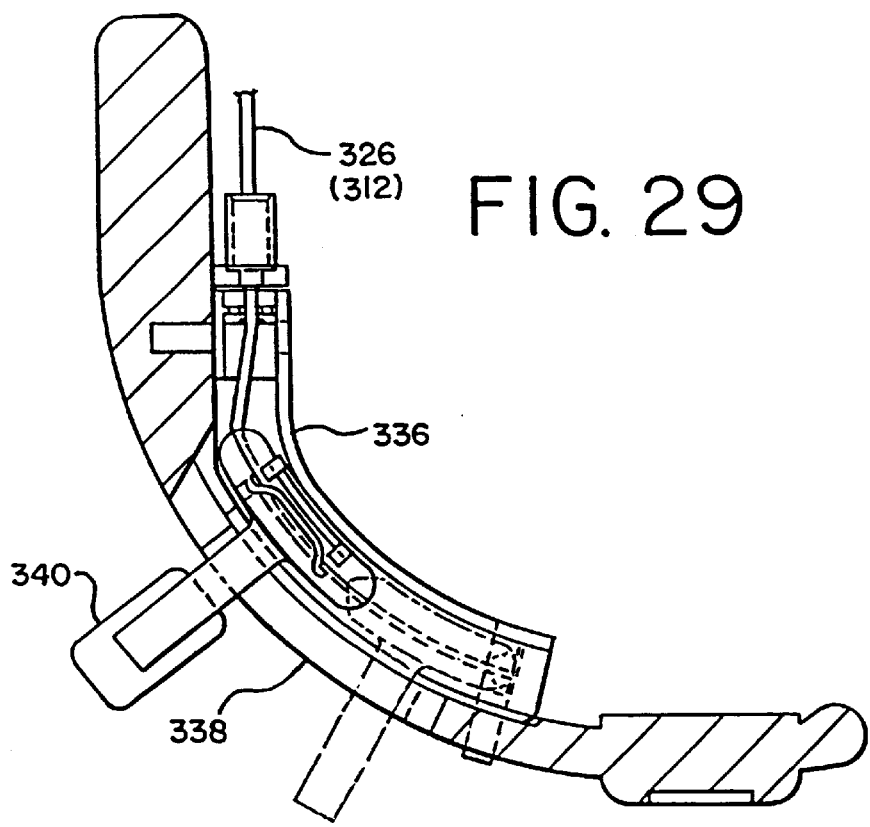
Figure 35:
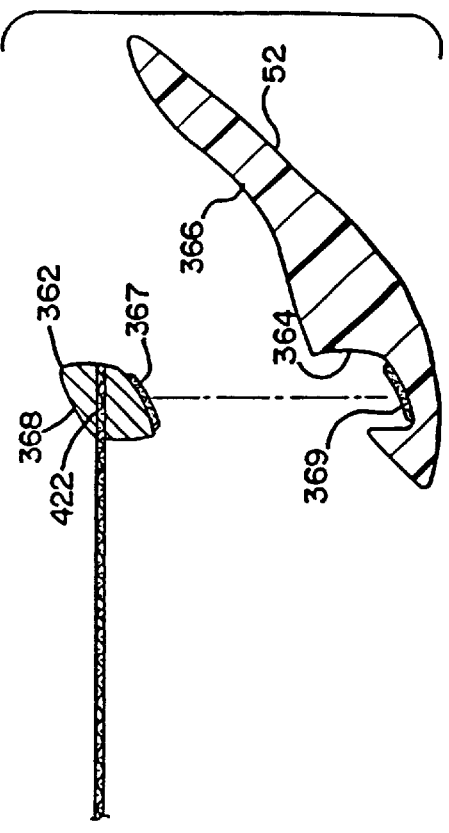
FIG. 35 is a cross-sectional view of the seat shown in FIG. 31.
Figure 34:
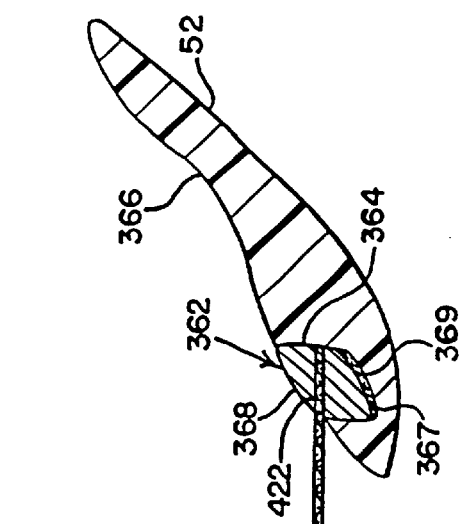
FIG. 34 is a cross-sectional view of the seat taken along the line 34—34 in FIG. 32.

Preferably, the cables 312 and 326 are adapted to be actuated from a location near the seat frame 32 so that a user does not have to lean over to adjust the tilt adjustment mechanisms 290 and 313. As shown in FIG. 28, a handle 332 can be configured for pivotal attachment within a cavity 334 formed in one of the second links 50, the seat frame 33, or other convenient location. The cable 312 or 326 can be thus actuated by merely pivoting the handle 332 a desired amount. Alternatively, a guide member 336 and slot 338 can be provided to allow slidable movement of a handle 340 to actuate the cable 312 or 326 as shown in FIG. 29.

Another feature of the chair 30 which assists in comfortably supporting a user in ergonomically desirable positions is the configuration of the seat 32. As best shown in FIGS. 30–35, the frame 33 of seat 32 supports the elastic membrane 210 across a central opening 352. Preferably, the frame 33 is a single molded piece of glass-filled thermoplastic polyester and the membrane 210 includes a plurality of interwoven fibers as discussed in more detail below. To provide a rim which conforms to the body of a user, the side portions 52 and a rear portion 354 of frame 33 curve upwardly. To minimize pressure on the underside of a user's thighs near the knees, especially when the chair 30 is tilted rearwardly, a front portion 356 of the frame 33 curves downwardly. The membrane 210 has a similar downwardly curving portion 357 which overlies the front portion 356 of the frame 33. To further reduce the pressure on the legs of a user, a cushion 358 made of polyurethane foam or similar material fits in a recess 360 formed in the front portion 356 of the frame.

Preferably, the entire periphery of the membrane 210 is attached to a one-piece carrier member 362 which is removably received by a continuous channel 364 in the seat frame 33. The channel 364 is formed in a top surface 366 of the seat frame 33 and extends around the entire perimeter of the frame 33. Although the carrier member 362 is securely held by the frame 33 within the channel 364, a strip 367 is provided on the underside of the carrier member 362 and an interlocking strip 369 is provided on a bottom surface of the channel 364 to further secure the carrier member 362 to the frame 33. The interlocking strips 367 and 369 can be hook and loop type fasteners such as VELCRO® and can be configured as separate tabs spaced around the periphery of the carrier member 362 and channel 364. The carrier member 362 is preferably made of a pliable yet semi-rigid thermoplastic polyester material such as polybutylene terphthalate (PTB), polystyrene or glass-filled polypropylene. The membrane 210 is preferably in-molded with the carrier member 362 as described in more detail below. Thus, the carrier member 362 is deformable yet has sufficient rigidity to maintain the desired contour of the membrane 210 when inserted in the channel 364. To this end, the carrier member 362 is formed with the same contour as the channel 364 including a downwardly extending front portion similar to the curvature of the front portion 356 of the frame 33.

In addition, a top surface 368 of the carrier member 362 is configured to follow the contour of the top surface 366 of the frame at any location around the perimeter. Thus, the top surface 368 of the carrier member 362 has a variable slope which generally corresponds with the downwardly extending front portion 356, the upwardly extending side portions 52, and the upwardly extending rear portion 354 of the frame 33. A smooth transition from the carrier member 362 to the frame 33 is therefore provided, which is especially desirable in the front portion of the seat where the legs of a user rest. To provide a smooth transition from the membrane 210 to a front portion 370 of the carrier member 362, the periphery of the membrane 210 is attached to an upper inner corner 372 of the carrier member 362 at generally the same angle as the top surface 368 of the carrier member 362. The remaining portion of the membrane 210 is shown attached to the carrier member 362 at a different angle than the corresponding top surface 368 of the carrier member 362.

However, it will be understood that the method for attaching the membrane 210 to the carrier member 362 allows any desired "entry-angle" between the periphery of the membrane 210 and the carrier member 362.

As shown in FIGS. 36–38, the membrane 210 is preferably made of a plurality of elastomeric monofilaments 374 interlaced with a plurality of strands 376 of fibrous yarn typically used in textile upholstery weaving. The elastomeric monofilaments 374 are extruded from a block copolymer of polyetramethylene terephthalate polyester and polytetramethylene ether. Preferably, this material is Hytrel® which is produced by the E. I. DuPont DeNemours Company and has a durometer of 55 on the D-scale, or more specifically, Hytrel® grade 5544 or 5556. The monofilaments 374 are extruded by standard industry techniques which are well known to those skilled in the art. During the extrusion process, the monofilaments 374 are annealed while under tension to orient the polyester molecules in one direction while leaving the poly ether molecules unaffected. This increases both the tensile strength and the modulus of elasticity of the monofilaments 374.

Preferably, the block copolymer is extruded into 2350 denier monofilaments having the following properties:

| EX-120 (Eytrel 5556) Lot X-2174 Properties Summary 5556 | | | | | | |
|---|---|---|---|---|---|---|
| Set No. | Diameter (mils) | | Load @ 5% Elongation (g) | Load @ 10% Elongation (g) | Load @ Break (g) | Elongation @ Break (%) |
| | Min. | Max. | | | | |
| 1 | 16.5 | 24.9 | 215 | 455 | 4903 | 117 |
| | 17.2 | 26.2 | 225 | 477 | 4803 | 113 |
| | 16.6 | 24.9 | 210 | 457 | 5330 | 129 |
| | 16.0 | 24.2 | 227 | 480 | 4980 | 122 |
| | 16.0 | 24.2 | 213 | 461 | 5058 | 122 |
| 10 | 15.9 | 24.1 | 239 | 481 | 4967 | 125 |
| | 16.6 | 25.1 | 221 | 455 | 5067 | 122 |
| | 16.5 | 25.2 | 200 | 428 | 4944 | 124 |
| | 16.1 | 24.3 | 211 | 441 | 4921 | 124 |
| | 16.0 | 24.3 | 220 | 450 | 5121 | 128 |
| 20 | 16.6 | 25.1 | 244 | 486 | 5389 | 127 |
| | 16.6 | 25.4 | 248 | 489 | 4958 | 123 |
| | 17.5 | 26.5 | 233 | 472 | 4958 | 116 |
| | 16.5 | 25.0 | 229 | 465 | 4999 | 126 |
| | 15.8 | 23.9 | 225 | 455 | 4429 | 102 |
| 37 | 15.8 | 24.0 | 235 | 489 | 4835 | 123 |
| | 15.9 | 24.1 | 246 | 515 | 4890 | 127 |
| | 16.3 | 24.4 | 234 | 513 | 5266 | 131 |
| | 16.4 | 25.1 | 193 | 464 | 4930 | 122 |
| | 16.4 | 24.8 | 234 | 513 | 5198 | 129 |
| Average | 16.36 | 24.79 | 225.10 | 472.30 | 4997.30 | 122.60 |
| Hi | 17.50 | 26.50 | 248.00 | 515.00 | 5389.00 | 131.00 |
| Low | 15.80 | 23.90 | 193.00 | 428.00 | 4429.00 | 102.00 |

The elastomeric monofilaments 374 are the primary load-carrying members of the membrane 210 and preferably run laterally in the warp direction between the side portions 52 of the seat 32 to comfortably support a user. The monofilaments 374 conform to the shape of a user's buttocks and also conform to the natural movement of the body when the chair 30 is in any tilt position. Preferably, the monofilaments 374 are prestretched between 6% and 9% elongation to maintain the desired contour of the membrane 210 prior to imparting a load on the membrane 210. In addition, the prestretching produces the optimum conforming characteristics of the monofilaments 374. A plurality of elastomeric monofilaments can also run longitudinally in the weft direction between the rear portion 354 and the front portion 356 of the seat 32 to provide further support which may add to the comfort of the seat 32. If elastomeric monofilaments are provided in both the lateral and longitudinal directions of the seat 32, the monofilaments in the lateral direction can be pretensioned a desired amount and the monofilaments in the longitudinal direction can be pretensioned a different amount to produce the desired pressure distribution of the seat 32.

To provide greater comfort to a user, the cross-sections of the elastic monofilaments 374 preferably have a width to height ratio in the range of 1.5/1 to 2/1. This provides greater comfort because the increased width of the monofilaments provides a greater surface area for supporting a user which distributes the forces acting on the user. Thus, the user feels less pressure from the individual monofilaments 374 as opposed to round monofilaments which are more like concentrated pressure points. In addition, the greater width of the monofilaments 374 creates a more opaque appearance of the membrane 210 which is attractive and may lessen the perception that the user is sitting on a net rather than a conventional cushion. In addition, the cross-section of the monofilaments 374 are preferably elliptical as shown in FIGS. 37 and 38 to provide a less abrasive support. The monofilaments can be configured with various other cross-sectional shapes which are less abrasive than a conventional round monofilament. To extrude the monofilaments 374 into the desired elliptical shape, the dies through which the block of copolymer material is drawn can have a octogonal cross-section. Preferably, the elliptical monofilaments 374 have a width of approximately 0.02479 inches and a height or thickness of approximately 0.01636 inches. With these dimensions, the membrane 210 has about 24–26 monofilaments per inch in the lateral direction.

Referring again to FIGS. 36–38, the fiber strands 376 run longitudinally in the weft direction of the seat 32 and are preferably arranged in groups of three. Each strand 376 preferably includes adjacent multifilament bundles 376A and 376B of spun, textured, or twisted 1500 denier Nylon or polyester yarn. To provide additional support in the longitudinal direction of the seat 32, an elastic monofilament 378 such as spandex is incorporated into each strand 376 by spinning, air jet texturing or covering the monofilament 378. The monofilaments 378 are preferably Lycra® monofilaments sold by the E. I. DuPont DeNemours Company, although other materials such as Hytrel® can be used to provide the desired support. The monofilaments 378 can be secured to the strands 376 in any suitable manner such as wrapping the fibers of bundles 376A or 376B around the monofilaments 378. In addition, a desired number of monofilaments 378 can be provided. The strands 376 are preferably prestretched between 3% and 5% elongation in order to maintain the desired contour of the membrane 210 with no load imparted on the membrane 210. In addition, the strands 376 are secondary load bearing members of the seat 32 and the prestretching produces the optimum conforming characteristics of the strands 376 when a user sits on the membrane 210. Preferably, the density of the strands 376 is approximately 7–10 strands per inch.

As shown in FIG. 36, the strands 376 are interlaced with the elastomeric monofilaments 374 in an attractive, tightly woven pattern which facilitates aeration and provides a smooth seating surface. The strands 376 are held in groups of three by pairs of the elastomeric monofilaments 374 which cross over between each group of strands. For example, monofilaments 374A and 374B are shown in FIG. 36 crossing over between a group 380 and a group 382 of strands 376. To maintain the spacing between each strand 376 in a group, the monofilaments 374 weave alternately above and below adjacent strands in the group. The plurality of strands 376 provide a relatively large surface area of nonabrasive fabric which distributes the forces acting on a user to avoid a "grid-mark" type feel resulting from the concentration of pressure. In addition, the weave pattern provides sufficient aeration through the openings between the monofilaments 374 and the strands 376 to allow evaporation of perspiration and facilitate air circulation to minimize heat buildup. The longitudinal orientation and the grouping of the strands 376 also provide an attractive seat with a longitudinal design and a relatively opaque appearance.

Figure 40:
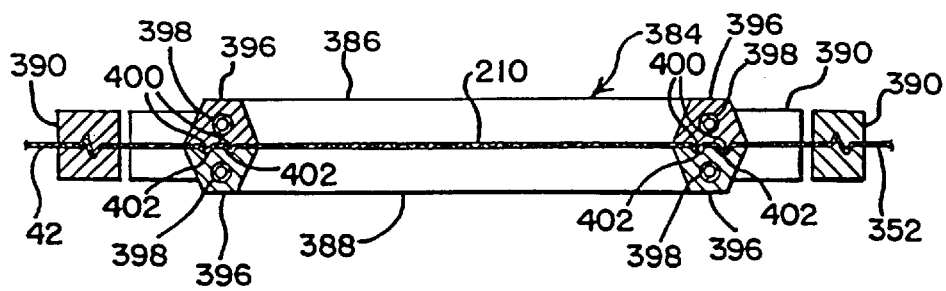
FIG. 40 is a cross-sectional view of the loom members, clamp members, and membrane taken along the line 40—40 in FIG. 39.
Figure 39:
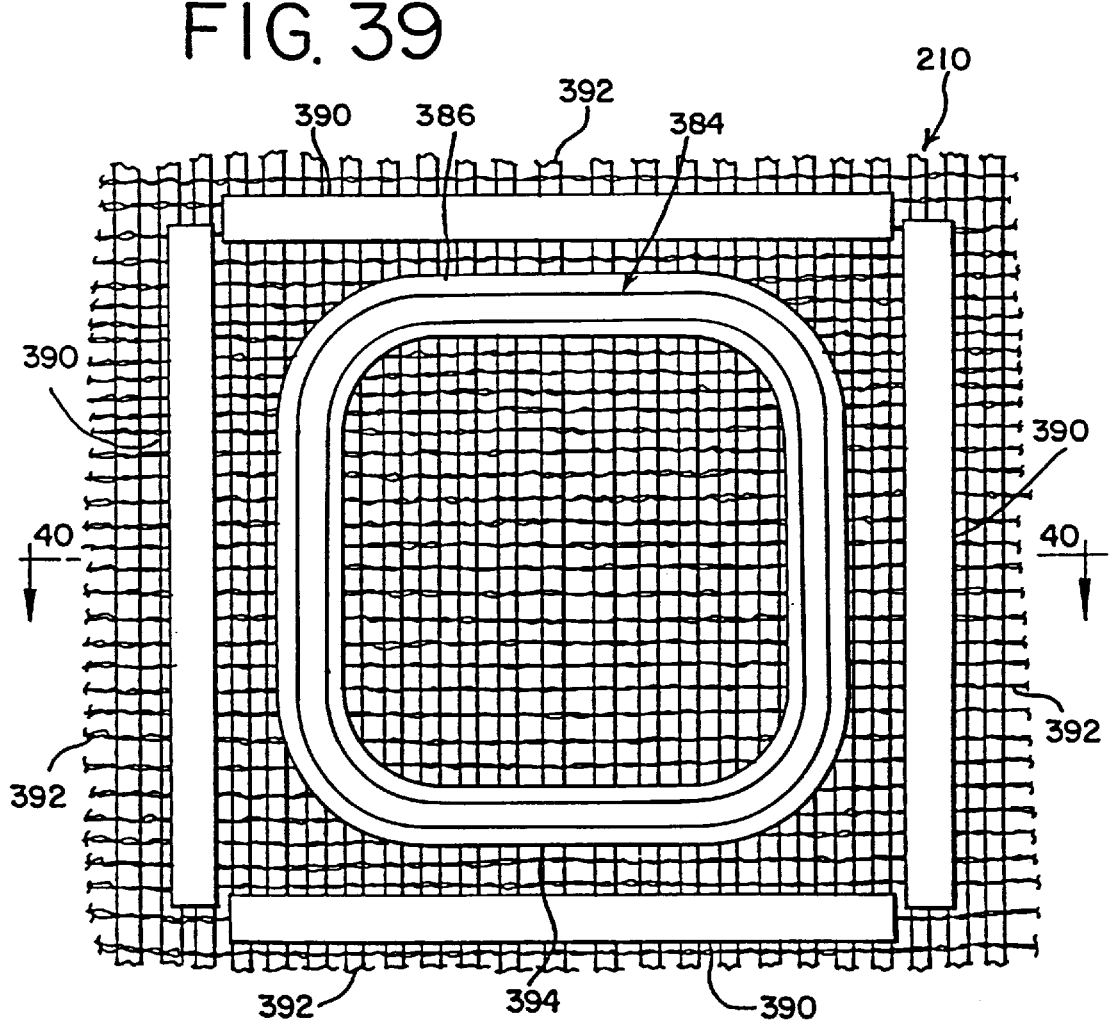
FIG. 39 is a top view of upper and lower loom members and clamp members clamped to the seat membrane.
Figure 41:
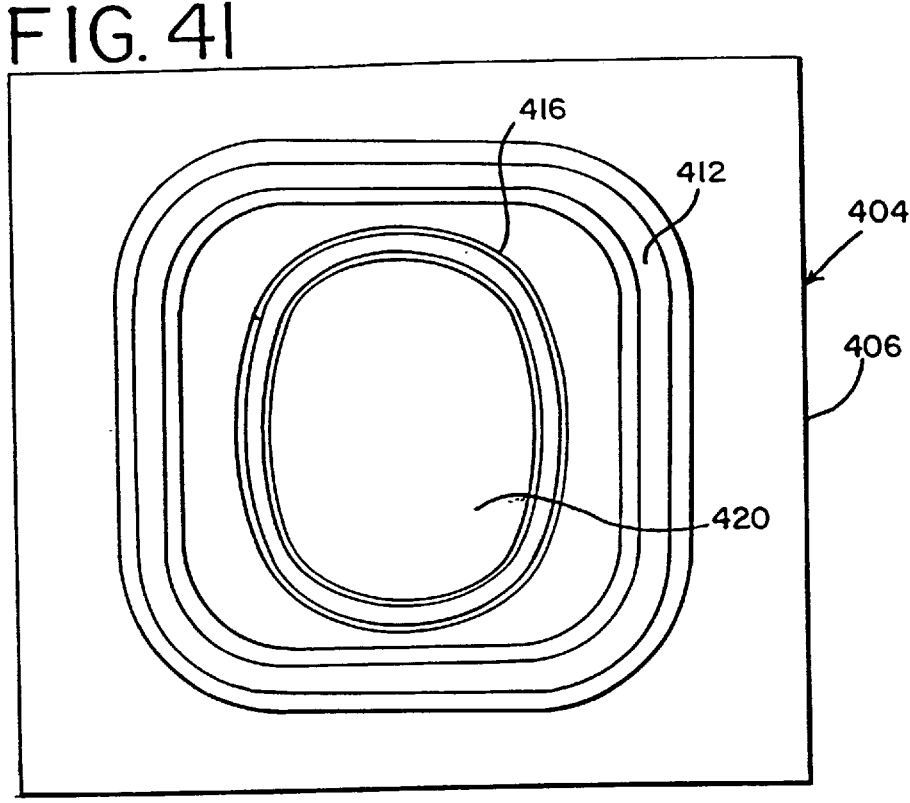
FIG. 41 is a top view of a lower mold member.
Figure 42:
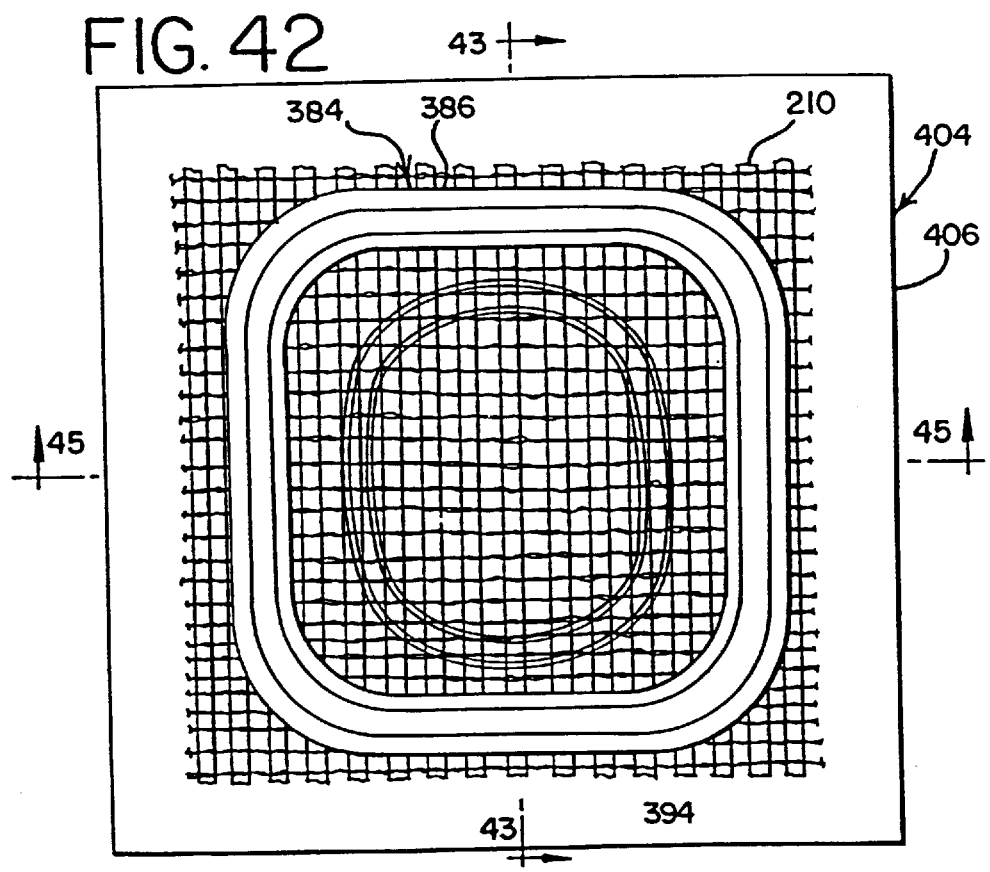
FIG. 42 is a top view of the loom member and membrane loaded in the lower mold member.

The method for forming the carrier member 362 and attaching the membrane 210 thereto will now be described with reference to FIGS. 39–48. As shown in FIGS. 39 and 40, a loom 384 having an upper member 386 and a lower member 388 is provided to capture and hold the membrane 210 in a stretched condition. The lower member 388 of loom 384 is initially placed in a stretching machine (not shown). The membrane 210 with the previously described weave pattern is then placed over the lower loom member 388, and clamp members 390 of the stretching machine clamp the edges of the membrane 210 and stretch it a predetermined amount in both the lateral and longitudinal directions. The upper loom member 386 is then clamped against the lower loom member 388 to hold the membrane 210 in the stretched condition. The clamp members 390 of the stretching machine release the membrane 210, and excess edge portions 392 of the membrane 210 outside the loom are trimmed a desired amount.

The loom 384 has a semi-rectangular shape with a central opening larger than the area defined by the carrier member 374. The loom 384 also has a downwardly extending front portion 394 which is similar to the contour of the downwardly extending front portion 356 of the frame 33. The upper and lower loom members 386 and 388 each include a frusto-conically shaped cover member 396 made of plastic such as an epoxy, urethane, or other suitable soft material which is molded over a bent steel tube 398. The steel tubes 398 are provided to give the loom members 386 and 388 structural support and the plastic members 396 are provided protect a steel molding tool from chipping or other damage. The upper loom member 386 has a pair of ridges 400 extending downwardly therefrom and the lower loom member 388 has a pair of matching grooves 402 formed therein to secure the membrane 210 therebetween. A plurality of clamp devices (not shown) are also provided to hold the loom members together and maintain the membrane 210 in the stretched condition.

As best shown in FIGS. 41–46, a molding tool 404 includes an upper mold member 406 and a lower mold member 408. The upper and lower mold members 406 and 408 have corresponding recesses 410 and 412 which are configured to receive the upper and lower loom members 386 and 388. The mold members 406 and 408 also have upper and lower recesses 414 and 416 which form a cavity 418 when the mold members 406 and 408 are closed together. The cavity 418 has the desired shape and contour of the carrier member 362 and a substantial portion of the cavity 418 is the same shape and contour of the channel a14 in the seat frame 33.

After the clamp members 390 of the stretching machine are removed and the excess edge portions of the membrane 210 are trimmed, the assembly of the loom 384 and stretched membrane 210 is removed for placement in the lower mold member 408. The lower loom member 388 is then placed in the recess 412 in the lower mold member 406 such that the membrane 210 is shaped over a curved inner male portion 420 of the lower mold member 408 as shown in FIG. 43. Thus, a periphery 422 of the membrane 210 is positioned at the desired angle over the recess 412 in the lower mold 408 and the prestretched membrane 210 attains the desired contour prior to closing the upper mold 406 against the lower mold 408. The upper mold 406 is then closed against the lower mold 408 without further stretching the membrane 210 or changing the position of the periphery 422 of the membrane 210 over the recess 412. The loom recess 410 in the upper mold 406 receives the upper loom member 386, and a female inner curved portion 424 of the upper mold 406 which is the same contour as the male inner curved portion 420 of the lower male mold 408 bears against the membrane 210. A plastic resin is then injected into the cavity 418 to secure the periphery 422 of the membrane 210. The upper and lower mold members 406 and 408 are then pulled apart, the carrier member 362 and membrane 210 assembly are removed, excess edge portions outside the carrier member 362 are trimmed, and the interlocking strip 367 is adhesively bonded to the underside of the carrier frame 362.

Figure 47:
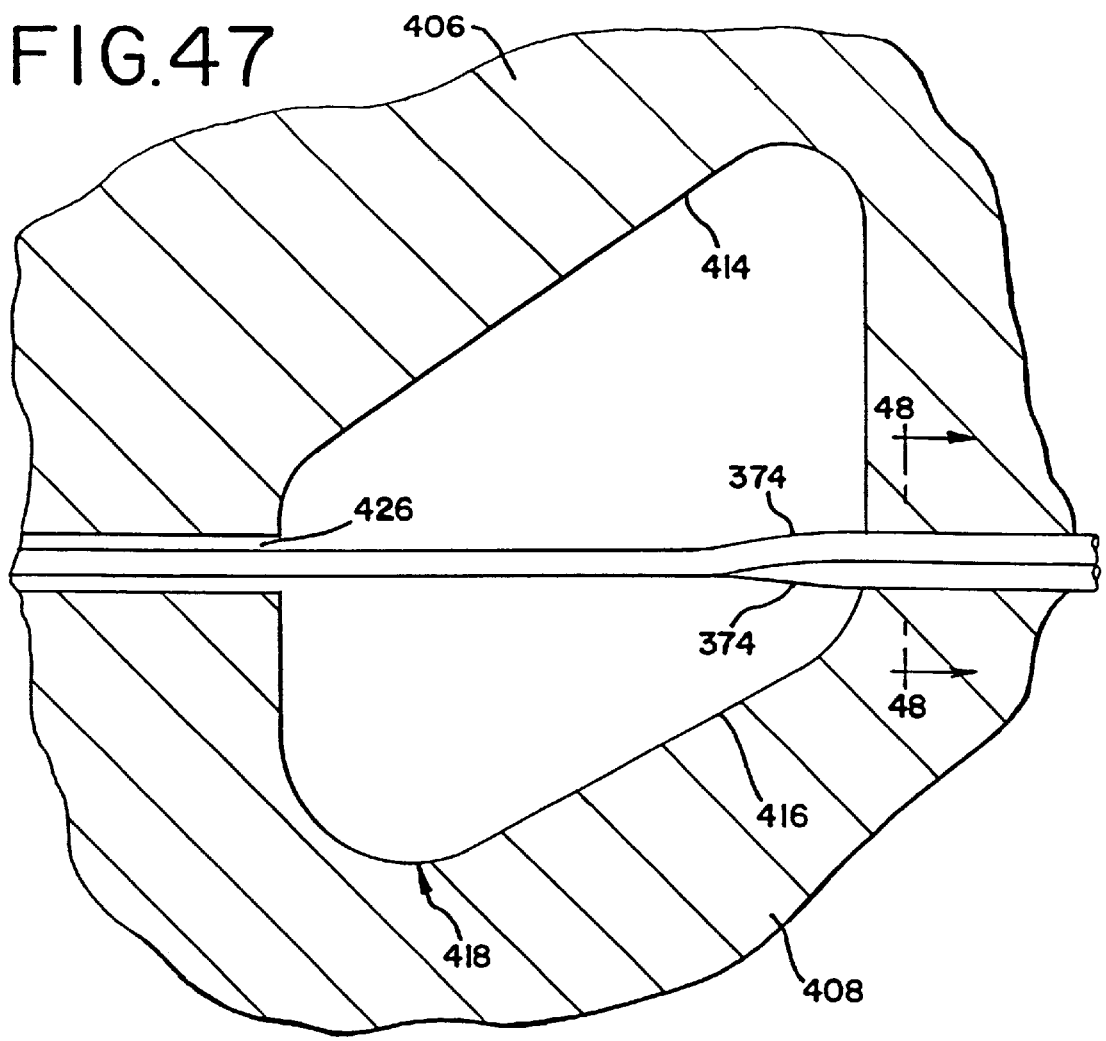
FIG. 47 is an exploded cross-sectional view of the closed mold members in FIGS. 44 and 46 showing a cavity and the membrane.
Figure 48:
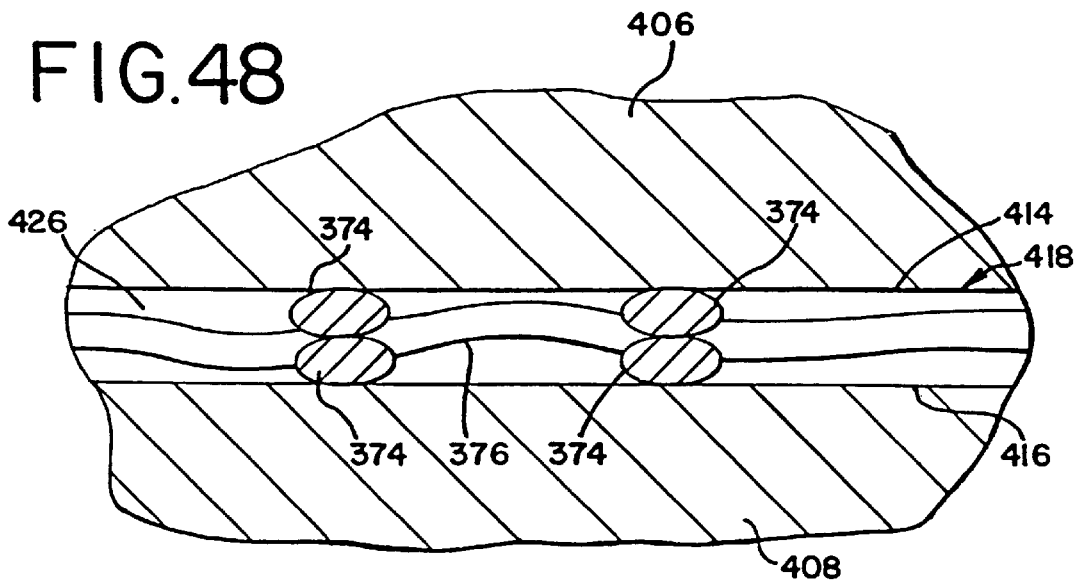
FIG. 48 is a cross-sectional view of the mold members and membrane taken along the line 48—48 in FIG. 47.
Figure 51:
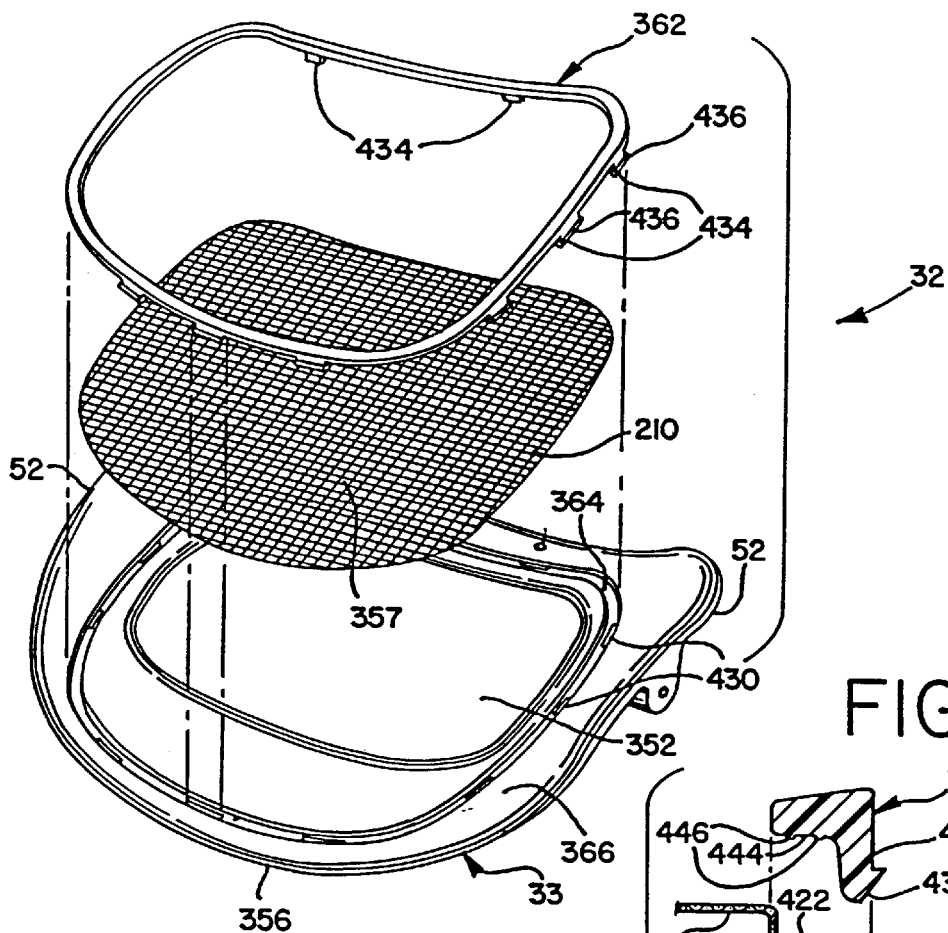
FIG. 51 is a perspective view of another alternative embodiment of the seat.

FIGS. 47 and 48 illustrate the upper and lower mold members 406 and 408 in a closed or "shut-off" position during which the resin is injected into the cavity 418. Because the membrane 210 has a thickness, the mold members 406 and 408 cannot be completely clamped against each other. The weaving of the monofilaments 374 and strands 376 creates a variable thickness membrane 210, and the closest the mold members 406 and 408 can be clamped together is determined by the thickest portions of the membrane 210. As shown in FIGS. 47 and 48, the thickest portions of the membrane 210 are in the regions where the elastomeric monofilaments 374 cross-over between the groups of strands 376. When the mold members 406 and 408 are closed against the monofilaments 374 in the cross-over region, the strands 376 and the single monofilaments 374 which are not overlapping have less thickness, thus creating a gap 426 between the mold members 406 and 408. It is desirable to minimize the gap 426 to inhibit the resin from leaking out of the cavity 418. Because the overall thickness of the overlapping elliptical monofilaments 374 is less than the thickness of overlapping round monofilaments, the mold members 406 and 408 can be clamped closer together to minimize the gap 426 and decrease the amount of leakage. In addition, the reduction in overall thickness tends creates less stress when the mold members 406 and 408 are clamped against the membrane 210 which tends to cause less damage to the monofilaments 374 and strands 376.

FIGS. 49–56 illustrate alternative embodiments of the seat 32. Since these embodiments are similar to the previously described embodiment, similar parts appearing in FIGS. 49–56 are represented by the same reference numerals. In FIGS. 49–56, the seat frame 33 includes a plurality of spaced apart slots 430 formed therein which extend through a bottom wall 432 of the channel a14. The carrier member 362 has a plurality of spaced apart tabs 434 extending downwardly from therefrom. The tabs 434 have a hook portion 436 extending outwardly from a lower end thereof and the slots 430 are of sufficient size to receive the tabs 434. The carrier member 362 is secured to the seat frame 33 by inserting the carrier member into the channel a14 and snapping the tabs 434 into the slots 430 such that the hook portions 436 extend through the slots 430 and engage an underside 438 of the frame 33. This embodiment for attaching the carrier member 374 to the frame 33 can be used with any type of seating utilizing a carrier frame regardless of the method used to attach the seating surface to the carrier member.

Figure 52:
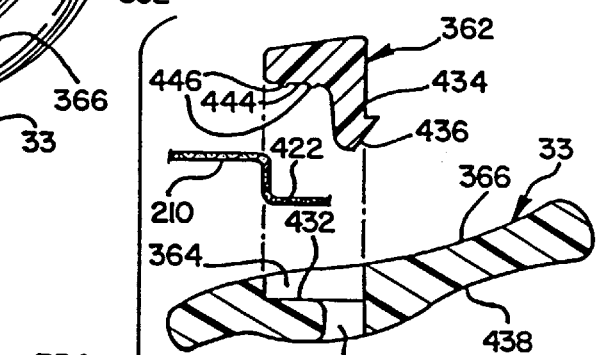
FIG. 52 is a cross-sectional view of the seat shown in FIG. 51.
Figure 53:
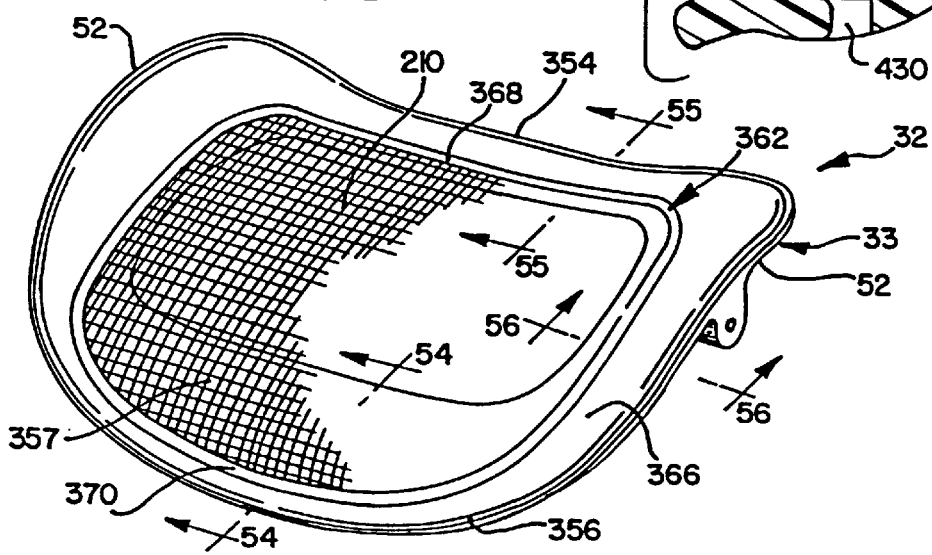
FIG. 53 is a perspective view of another alternative embodiment of the seat.

FIGS. 49–56 also illustrate alternative embodiments for attaching the membrane 210 to the carrier frame 362. For example, the periphery 422 of the membrane 210 can be molded with an insert 440 which is press fit inside a cavity 442 formed in a top surface of the carrier member 362 (FIGS. 49–50). The periphery 422 of the membrane 210 can also be vibration or sonic welded to a bottom surface 444 of the carrier member 362 as shown in FIGS. 51–56, and a plurality of teeth members 446 can extend downwardly from the bottom surface 444 to further secure the membrane 210 thereto as shown in FIG. 52.

Preferably, the backrest 34 is constructed with the same materials and in the same manner as the seat 32, although the desired amount of prestretching of the elastomeric monofilaments and strands may vary to reflect the different support required for the back of a user.

Pre-assembly of the seat and backrest membranes to the carrier members facilitates maintenance since the membrane/carrier member assemblies can be easily removed for repair and/or replacement. This configuration also provides greater manufacturing flexibility. Since the carrier members do not have the structural requirements of a seat or backrest frame, a desired material can be used for a desired type of attachment method. For example, the material of the carrier member can be chosen based on whether the membrane is to be insert molded therewith or welded thereto. A semi-rigid material can be used to facilitate the insert molding process and pre-stretching of the membrane, and a material having a low melting point can be used to facilitate welding of the membrane thereto.

The in-molding process for attaching the membranes to the carrier frames also provides significant advantages over other attachment methods. For example, the configuration of the mold cavities can be varied to provide the frames and carrier members with any type of contour which facilitates design flexibility. The top surfaces of the frames and carrier members can have the same slope to provide a smooth transition between the frames and the carrier members. The shape of the membranes and the angle at which the membranes are attached to the carrier members can also be easily adjusted. In addition, the in-molding process allows the frames to be thinner because a relatively small channel is all that is required for attachment of the carrier members to the frame.

The membranes also provide a flexible support which conforms to the natural movement of the body of a user when the chair is in any tilt position. FIGS. 2–10 show the approximate position of the seat and backrest membranes when a user is sitting thereon. The membranes tend to minimize fatigue because they are responsive to micro-postural changes of a user which stimulates muscles in the trunk and allows spinal movement to hydrate the spinal discs.

In the forward tilt position (FIGS. 8 and 10), the seat membrane 210 maintains a forward angle of the pelvis which insures a proper curvature of the spine. The elasticity of the seat membrane 210 allows the thighs of a user to slant forward while keeping the pelvis on a horizontal plane, thereby giving the user the sensation of not sliding out of the chair and reducing shear forces acting on the underside of the user's thighs. The seat membrane 210 also passively positions the lumbar region of a user's back against the bowed section 86 of the backrest membrane 82. In the middle and reclined tilt positions shown in FIGS. 2–7 and 9, the elasticity of the seat membrane 210 automatically causes larger buttocks to wedge more deeply into the pocket between the seat 32 and backrest 34 to insure correct positioning of the user's lumbar region against the bowed section 86 of the backrest mat.

The porosity of the backrest and seat membranes allows air to flow through the membranes to aerate the skin of a user. Providing such aeration decreases uncomfortable heat buildup which would otherwise occur when a user sits for an extended period of time on conventional chair upholstery which acts like another layer of clothing.

Thus, the tilt motion of the chair 32 and the resiliency of the seat and backrest membranes passively stabilizes the pelvic-lumbar process to reduce muscle activity heretofore associated with leg crossing and slumping postures. In addition, the membranes accommodate for angular variations in the sacral plates of various user's spinal columns.

Thus, in accordance with the most preferred embodiment, a chair is provided which naturally conforms to the body of user during tilting of the chair to reduce shear forces acting on the thighs and trunk of the user and minimize pressure acting on the underside of the user's thighs at the knees. The chair automatically supports the body of the user in ergonomically desirable positions for performing tasks of varying intensity, and the range of vertical adjustment of the chair allows a lower minimum height and higher maximum height than conventional office chairs.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting. It is the appended claims, including all equivalents thereof, which are intended to define the scope of the invention.

We claim:

1. A backrest for a chair comprising:
   a frame;
   a membrane attached to said frame and having a first body-contacting surface and an opposite second surface, wherein at least a portion of said membrane is see through, and wherein said membrane comprises an elastomeric material, wherein said elastomeric material comprises elastomeric monofilaments, and wherein said membrane comprises a fabric comprising said elastomeric monofilaments and stands of monofilament yarn; and
   a back support member attached to said frame and having a support surface, wherein at least a portion of said support surface contacts said second surface of said membrane, and wherein at least a portion of said back support member is visible through said membrane from said first body contacting surface thereof.

2. The invention of claim 1 wherein said back support member is rotatable about a substantially horizontal axis.

3. The invention of claim 1 wherein said back support member is a lumbar support member connected to a lower portion of said frame.

4. The invention of claim 1 wherein said membrane comprises a single layer of material and wherein said back support member comprises a rear surface opposite said support surface, wherein at least a portion of said rear surface is exposed to a user.

5. The invention of claim 1 wherein said frame has a central opening therethrough, wherein said membrane covers said central opening, and wherein said back support member extends across at least a portion of said central opening.

6. The invention of claim 5 wherein an entire periphery of said membrane is attached to said frame.

7. The invention of claim 1 wherein said frame comprises a pair of vertical side members, wherein said back support member extends between and is connected to said side members.

8. The invention of claim 7 wherein said frame further comprises top and bottom members extending between and connecting said side members, wherein said back support member is disposed between said top and bottom members.

9. The invention of claim 7 wherein each of said side members has a bowed section.

10. The invention of claim 7 wherein said back support member is movably connected to said side members, wherein said back support member can be moved relative to said frame.

11. The invention of claim 10 wherein said back support member comprises a hook member engaging an edge of each of said side members.

12. A backrest for a chair comprising:
a frame;
a membrane attached to said frame and having a first body-contacting surface and an opposite second surface, wherein at least a portion of said membrane is see through; and
a back support member attached to said frame and having a support surface, wherein at least a portion of said support surface contacts said second surface of said membrane, and wherein at least a portion of said back support member is visible through said membrane from said first body-contacting surface thereof, and wherein said back support member has opposite end portions and a middle portion, each of said opposite end portions and said middle portion having a height, wherein said height of said middle portion is greater than the heights of said opposite end portions.

13. The invention of claim 12 wherein said back support member is substantially oval shaped.

14. The invention of claim 12 wherein said back support member is rotatable about a substantially horizontal axis.

15. The invention of claim 12 wherein said back support member is a lumbar support member connected to a lower portion of said frame.

16. The invention of claim 12 wherein said membrane comprises a single layer of material and wherein said back support member comprises a rear surface opposite said support surface, wherein at least a portion of said rear surface is exposed to a user.

17. The invention of claim 12 wherein said frame comprises a pair of vertical side members, wherein said back support member extends between and is connected to said side members.

18. The invention of claim 17 wherein said frame further comprises top and bottom members extending between and connecting said side members, wherein said back support member is disposed between said top and bottom members.

19. The invention of claim 17 wherein said back support member is movably connected to said side members, wherein said back support member can be moved relative to said frame.

20. The invention of claim 19 wherein said back support member comprises a hook member engaging an edge of each of said side members.

21. A bracket for a chair comprising:
a frame having a central opening therethrough, wherein said frame comprises a channel formed around an entire perimeter of said central opening;
a membrane having a first body contacting surface and an opposite second surface, wherein at least a portion of said membrane is see through, and wherein said membrane covers said central opening;
a back support member attached to said frame and having a support surface, wherein at least a portion of said support surface contacts said second surface of said membrane, and wherein at least a portion of said membrane support member is visible through said membrane from said first body-contacting surface thereof, wherein said back support member extends across at least a portion of said central opening; and
a carrier member secured of said membrane, wherein said carrier member is inserted into said channel, wherein said membrane is attached to said frame.

22. The invention of claim 21 wherein said membrane comprises a single layer of material and wherein said back support member comprises a rear surface opposite said support surface, wherein at least a portion of said rear surface is exposed to a user.

23. The invention of claim 21 wherein said carrier member extends around an entire perimeter of said membrane.

24. The invention of claim 23 wherein an edge portion of said membrane is molded with said carrier member.

25. A bracket for a chair comprising:
a frame having a pair of since members and a top member and a bottom member extending between and connecting said side members, wherein said side members and said top and bottom members define an opening therebetween,
a membrane attached to side members, said top member and said bottom member across said opening, said membrane having a first body contacting surface and an opposite second surface, wherein at least a portion of said membrane is see through, and wherein said membrane comprises an elastomeric material; and
a back support member disposed in said opening of said frame between said side members and between said top and bottom members, wherein said back support member has a support surface, wherein at least a portion of said support surface contacts said second surface of said membrane, and wherein at least a portion of said back support member is visible through said membrane from said first body-contacting surface thereof, and wherein said back support member is rotatable about a substantially horizontal axis.

26. The invention of claim 25 wherein said back support member is made of a flexible material.

27. The invention of claim 25 wherein each of said side members has a bowed section.

28. The invention of claim 25 wherein said membrane comprises a single layer of material and wherein said back support member comprises a rear surface opposite said support surface, wherein at least a portion of said rear surface is exposed to a user.

29. The invention of claim 25 wherein said back support member is connected to said frame.

30. The invention of claim 29 wherein said back support member is moveably connected to said side members.

31. The invention of claim 30 wherein said back support member comprises a hook member engaging an edge of each of said side members.

32. A backrest for a chair comprising:
a frame having a pair of side members and a top member and a bottom member extending between and connecting said side members, wherein said side members and said top and bottom members define an opening therebetween;

a membrane attached to side members, said top member and said bottom member across said opening, said membrane having a first body-contacting surface and an opposite second surface, wherein at least a portion of said membrane is see through; and a back support member disposed in said opening of said frame between said side members and between said top and bottom members, wherein said back support member has a support surface, wherein at least a portion of said support surface contacts said second surface of said membrane, wherein at least a portion of said back support member is visible through said membrane from said first body-contacting surface thereof, and wherein said back support member has opposite end portions and a middle portion, each of said opposite end portions and said middle portion having a height, wherein said height of said middle portion is greater than the heights of said opposite ends.

33. The invention of claim 12 wherein said back support member is substantially oval shaped.

34. The invention of claim 32 wherein said membrane comprises a single layer of material and wherein said back support member comprises a rear surface opposite said support surface, wherein at least a portion of said rear surface is exposed to a user.

35. A backrest for a chair comprising:

a frame having a pair of side members and a top member and a bottom member extending between and connecting said side members, wherein said side members and said top and bottom members define an opening therebetween and wherein said frame comprises a channel, wherein said channel is formed in each of said side members, said top member and said bottom member around an entire perimeter of said opening;

a membrane attached to side members, said top member and said bottom member across said opening, said membrane having a first body-contacting surface and an opposite second surface, wherein at least a portion of said membrane is see through;

a back support member disposed in said opening of said frame between said side members and between said top and bottom members, wherein said back support member has a support surface, wherein at least a portion of said support surface contacts said second surface of said membrane, wherein at least a portion of said back support member is visible through said membrane from said first body-contacting surface thereof; and a carrier member secured to said membrane, wherein said carrier member is inserted into said channel.

36. The invention of claim 35 wherein said membrane comprises a single layer of material and wherein said back support member comprises a rear surface opposite said support surface, wherein at least a portion of said rear surface is exposed to a user.

37. The invention of claim 35 wherein said carrier member extends around an entire perimeter of said membrane.

38. The invention of claim 37 wherein an edge portion of said membrane is molded with said carrier member.

39. A backrest for a chair comprising:

a frame having a pair of side members and a top member and a bottom member extending between and connecting said side members, wherein said side members and said top and bottom members define an opening therebetween;

a membrane attached to side members, said top member and said bottom member across said openings said membrane having a first body-contacting surface and an opposite second surface, wherein at least a portion of said membrane is see through, and wherein said membrane comprises an elastomeric material, wherein said elastomeric material comprises elastomeric monofilaments, and wherein said membrane comprises a fabric comprising said elastomeric monofilaments and stands of multifilament yarn; and a back support member disposed in said opening of said frame between said side members and between said top and bottom members, wherein said back support member has a support surface, wherein at least a portion of said support surface contacts said second surface of said membrane, and wherein at least a portion of said back support member is visible through said membrane from said first body-contacting surface thereof.

* * * * *

UNITED STATES PATENT AND TRADEMARK OFFICE
CERTIFICATE OF CORRECTION

PATENT NO.    : 6,588,842 B2
DATED         : July 8, 2003
INVENTOR(S)   : William E. Stumpf et al.

It is certified that error appears in the above-identified patent and that said Letters Patent is hereby corrected as shown below:

Title Page,
Item [56], References Cited, OTHER PUBLICATIONS, insert
-- International Search Report for PCT/US93/05731 --.

Column 22,
Line 10, delete "stands of monofilament" and substitute -- strands of multifilament -- in its place.
Line 17, delete "body contacting" and substitute -- body-contacting -- in its place.

Column 23,
Line 1, delete "bracket" and substitute -- backrest -- in its place.

Column 24,
Lines 1 and 32, delete "body contacting" and substitute -- body-contacting -- in its place.
Line 13, delete "membrane" and substitute -- back -- in its place.
Line 25, delete "bracket" and substitute -- backrest -- in its place.
Line 26, delete "since" and substitute -- side -- in its place.
Line 29, immediately after "therebetween" delete "," (comma) and substitute -- ; -- (semicolon) in its place.

Column 26,
Line 24, delete "openings" and substitute -- opening, -- in its place.
Line 33, delete "stands" and substitute -- strands -- in its place.

Signed and Sealed this

Tenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,588,842 B2
DATED         : July 8, 2003
INVENTOR(S)   : William E. Stumpf et al.

It is certified that error appears in the above-identified patent and that said Letters Patent is hereby corrected as shown below:

Column 24,
Line 33, delete "body contacting" and substitute -- body-contacting -- in its place.

Column 25,
Line 19, delete "claim 12" and substitute -- claim 32 -- in its place.

Signed and Sealed this

Seventh Day of September, 2004

JON W. DUDAS
*Director of the United States Patent and Trademark Office*